(12) United States Patent
Khoshnevisan et al.

(10) Patent No.: US 12,063,673 B2
(45) Date of Patent: *Aug. 13, 2024

(54) LINKING SEARCH SPACE SETS FOR PHYSICAL DOWNLINK CONTROL CHANNEL REPETITIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,545

(22) Filed: Jun. 6, 2023

(65) Prior Publication Data
US 2023/0397236 A1 Dec. 7, 2023

Related U.S. Application Data

(63) Continuation of application No. 17/118,540, filed on Dec. 10, 2020, now Pat. No. 11,711,832.

(Continued)

(51) Int. Cl.
*H04W 72/53* (2023.01)
*H04W 8/24* (2009.01)
(Continued)

(52) U.S. Cl.
CPC .............. *H04W 72/53* (2023.01); *H04W 8/24* (2013.01); *H04W 24/08* (2013.01); *H04W 72/0466* (2013.01); *H04W 72/23* (2023.01)

(58) Field of Classification Search
CPC ......... H04W 72/0406; H04W 72/0493; H04W 72/042; H04W 72/044; H04W 72/0446;
(Continued)

(56) References Cited

U.S. PATENT DOCUMENTS

2016/0021658 A1 1/2016 Chen et al.
2017/0223670 A1 8/2017 Chen et al.
(Continued)

FOREIGN PATENT DOCUMENTS

CA 2875610 A1 12/2013
CA 3049166 A1 7/2018
(Continued)

OTHER PUBLICATIONS

Huawei, et al., "Discussion on Transmission Parameter Sets", 3GPP Draft, 3GPP TSG RAN WG1 NR Ad-Hoc#3, R1-1715464, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051338932, 2 Pages, section 2.1.
(Continued)

*Primary Examiner* — Kevin D Mew
(74) *Attorney, Agent, or Firm* — Holland & Hart LLP

(57) ABSTRACT

Methods, systems, and devices for wireless communications are described. Linking multiple search space sets for physical downlink control channel (PDCCH) repetition may be enabled in a system. A user equipment (UE) may receive an indication of a configured search space set association from a base station. The association may indicate, to the UE, a configuration between a first PDCCH candidate and a second PDCCH candidate. The first PDCCH candidate may correspond to a first search space set, while the second PDCCH candidate may correspond to a second search space
(Continued)

set. The UE may monitor the first and second search space set based on the configuration. The UE may combine the first PDCCH candidate with the second PDCCH candidate monitored in the first and second search space set based on capabilities of the UE and the configuration. The UE may decode the combined PDCCH candidates along with individual PDCCH candidates.

20 Claims, 18 Drawing Sheets

Related U.S. Application Data

(60) Provisional application No. 62/952,212, filed on Dec. 20, 2019.

(51) Int. Cl.
*H04W 24/08* (2009.01)
*H04W 72/044* (2023.01)
*H04W 72/23* (2023.01)

(58) Field of Classification Search
CPC ......... H04W 72/0453; H04W 72/0466; H04W 8/22; H04W 8/24; H04W 8/245; H04W 24/08
See application file for complete search history.

(56) References Cited

U.S. PATENT DOCUMENTS

| | | | |
|---|---|---|---|
| 2018/0192405 A1 | 7/2018 | Gong et al. | |
| 2018/0279344 A1 | 9/2018 | Bagheri et al. | |
| 2019/0053270 A1 | 2/2019 | Akoum et al. | |
| 2019/0342907 A1* | 11/2019 | Huang | H04W 72/23 |
| 2020/0022144 A1* | 1/2020 | Papasakellariou | H04W 72/23 |
| 2020/0029310 A1 | 1/2020 | Lee et al. | |
| 2020/0092813 A1 | 3/2020 | Kim et al. | |
| 2020/0112917 A1 | 4/2020 | Nam et al. | |
| 2020/0154413 A1 | 5/2020 | Hosseini et al. | |
| 2020/0154450 A1 | 5/2020 | Zhou et al. | |
| 2020/0177323 A1 | 6/2020 | Fakoorian et al. | |
| 2020/0187171 A1 | 6/2020 | Hwang et al. | |
| 2020/0351682 A1 | 11/2020 | Cirik et al. | |
| 2021/0195601 A1 | 6/2021 | Khoshnevisan et al. | |
| 2021/0234640 A1 | 7/2021 | Cirik et al. | |
| 2022/0264339 A1 | 8/2022 | Kim et al. | |

FOREIGN PATENT DOCUMENTS

| | | | |
|---|---|---|---|
| CN | 112602283 A | 4/2021 | |
| WO | WO-2015116732 A1 * | 8/2015 | ........... H04B 17/318 |
| WO | WO-2018144852 A1 | 8/2018 | |
| WO | WO-2018165202 A1 | 9/2018 | |
| WO | WO-2019099880 A1 | 5/2019 | |
| WO | WO-2019105232 A1 | 6/2019 | |
| WO | WO-2020033647 A1 * | 2/2020 | ........... H04L 1/0038 |
| WO | WO-2020064512 A1 | 4/2020 | |
| WO | WO-2021011107 A1 | 1/2021 | |

OTHER PUBLICATIONS

Intel Corporation: "Ultra-Reliability for NR PDCCH", 3GPP Draft, 3GPP TSG RAN WG1 Meeting 91, R1-1720084, Intel—DL Control URLLC, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369765, pp. 1-5, section 2.2, paragraph [02.2] figure 1.

Interdigital, et al., "On PDCCH Transmission with High Reliability", 3GPP Draft, 3GPP TSG RAN WG1 Meeting #92, R1-1802576, (R15 NR WI AI 723 URLLC DCI Transmission), 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018, XP051397485, 4 Pages, Sections 2.3 and 2.4.

International Search Report and Written Opinion—PCT/US2020/064539—ISA/EPO—Mar. 15, 2021.

Intel Corporation: "On NR PDCCH Repetitions for URLLC", 3GPP Draft, R1-1802423, 3GPP TSG RAN WG1 Meeting #92, Intel—PDCCH Repetitions, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, 5 Pages, Feb. 17, 2018, XP051397948, section 3.

* cited by examiner

LINKING SEARCH SPACE SETS FOR PHYSICAL DOWNLINK CONTROL CHANNEL REPETITIONS

CROSS-REFERENCE TO RELATED APPLICATION(S)

The present application for patent is a Continuation of patent application Ser. No. 17/118,540 by Khoshnevisan et al., entitled "LINKING SEARCH SPACE SETS FOR PHYSICAL DOWNLINK CONTROL CHANNEL REPETITIONS" filed on Dec. 10, 2020, and assigned to the assignee hereof which claims the benefit of U.S. Provisional Patent Application No. 62/952,212 by Khoshnevisan et al., entitled "LINKING SEARCH SPACE SETS FOR PHYSICAL DOWNLINK CONTROL CHANNEL REPETITIONS," filed Dec. 20, 2019, assigned to the assignee hereof, the entire content of each of which is expressly incorporated by reference herein.

FIELD OF TECHNOLOGY

The following relates generally to wireless communications and more specifically to linking search space sets for physical downlink control channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support linking search space sets for physical downlink control channel (PDCCH) repetitions. Generally, the described techniques provide for identifying multiple PDCCH candidates corresponding to respective search space sets, where the PDCCH candidates or search space sets may be linked or associated with each other through a configuration or fixed rule. The linked search space sets may enable a user equipment (UE) to combine multiple PDCCH candidates to obtain control information. For example, a UE may receive a configuration that indicates an association between multiple (e.g., two) search space sets, or multiple (e.g., two) PDCCH candidates, where each PDCCH candidate corresponds to a search space set. In some cases, the UE may monitor the corresponding search space sets (e.g., during one or more monitoring occasions within a slot or across multiple slots) for a combined PDCCH candidate based on an association between the respective occurrences of the search space sets. Upon detection, the UE may combine PDCCH candidates, and the UE may identify downlink control information (DCI) after decoding the combined PDCCH candidate.

A method for wireless communication at a user equipment (UE) is described. The method may include receiving, from a base station, a configuration that indicates an association between a first search space set and a second search space set, determining an association between a first physical downlink control channel candidate in the first search space set and a second physical downlink control channel candidate in the second search space set, combining, according to the configuration and based on the determining, the first physical downlink control channel candidate and the second physical downlink control channel candidate based on monitoring for the first search space set and the second search space set, and decoding the combined first physical downlink control channel candidate and the second physical downlink control channel candidate.

An apparatus for wireless communication at a UE is described. The apparatus may include a processor, memory in electronic communication with the processor, and instructions stored in the memory. The instructions may be executable by the processor to cause the apparatus to receive, from a base station, a configuration that indicates an association between a first search space set and a second search space set, determine an association between a first physical downlink control channel candidate in the first search space set and a second physical downlink control channel candidate in the second search space set, combine, according to the configuration and based on the determining, the first physical downlink control channel candidate and the second physical downlink control channel candidate based on monitoring for the first search space set and the second search space set, and decode the combined first physical downlink control channel candidate and the second physical downlink control channel candidate.

Another apparatus for wireless communication at a UE is described. The apparatus may include means for receiving, from a base station, a configuration that indicates an association between a first search space set and a second search space set, means for determining an association between a first physical downlink control channel candidate in the first search space set and a second physical downlink control channel candidate in the second search space set, means for combining, according to the configuration and based on the determining, the first physical downlink control channel candidate and the second physical downlink control channel candidate based on monitoring for the first search space set and the second search space set, and means for decoding the combined first physical downlink control channel candidate and the second physical downlink control channel candidate.

A non-transitory computer-readable medium storing code for wireless communication at a UE is described. The code may include instructions executable by a processor to receive, from a base station, a configuration that indicates an association between a first search space set and a second search space set, determine an association between a first physical downlink control channel candidate in the first search space set and a second physical downlink control channel candidate in the second search space set, combine, according to the configuration and based on the determining, the first physical downlink control channel candidate and the second physical downlink control channel candidate based on monitoring for the first search space set and the second search space set, and decode the combined first physical downlink control channel candidate and the second physical downlink control channel candidate.

Some examples of the method, apparatuses, and non-transitory computer-readable medium described herein may further include operations, features, means, or instructions for identifying, from the received configuration or a second configuration, a set of parameters that indicate the association between the first physical downlink control channel candidate and the second physical downlink control channel candidate, where the set of parameters includes an indication of the first search space set associated with a first control resource set, an indication of the second search space set associated with a second control resource set, an index of the first physical downlink control channel candidate, an index of the second physical downlink control channel candidate, an aggregation level of the first physical downlink control channel candidate, or an aggregation level of the second physical downlink control channel candidate, or any combination thereof and monitoring for the first search space set and the second search space set based on identifying the set of parameters.

In some examples of the method, apparatuses, and non-transitory computer-readable medium described herein, identifying the set of parameters may include operations, features, means, or instructions for identifying respective sets of parameters for each combined physical downlink control channel candidate of one or more combined physical downlink control channel candidates.

In some examples of the method, apparatuses, and non-transitory computer-readable medium described herein, identifying the set of parameters may include operations, features, means, or instructions for identifying respective sets of parameters for each search space set pair of one or more search space set pairs.

In some examples of the method, apparatuses, and non-transitory computer-readable medium described herein, the first physical downlink control channel candidate may have a same aggregation level as the second physical downlink control channel candidate.

Some examples of the method, apparatuses, and non-transitory computer-readable medium described herein may further include operations, features, means, or instructions for identifying a first configuration for the first search space set, the first configuration indicating one or more monitoring occasions for the first search space set, identifying a second configuration for the second search space set, the second configuration indicating one or more monitoring occasions for the second search space set, and monitoring for the combined first physical downlink control channel candidate and the second physical downlink control channel candidate based on the first search space set and the second search space set and in accordance with the first configuration and the second configuration.

In some examples of the method, apparatuses, and non-transitory computer-readable medium described herein, monitoring for the first search space set and the second search space set may include operations, features, means, or instructions for identifying that the first search space set and the second search space set may be included within a same time interval and monitoring for the combined first physical downlink control channel candidate and the second physical downlink control channel candidate based on identifying that the first search space set and the second search space set may be included within the same time interval.

Some examples of the method, apparatuses, and non-transitory computer-readable medium described herein may further include operations, features, means, or instructions for identifying that each of the first search space set and the second search space set may have a single monitoring occasion within the time interval based on the first configuration and the second configuration and identifying the time interval including the first search space set and the second search space set, where combining the first physical downlink control channel candidate and the second physical downlink control channel candidate may be based on the time interval.

Some examples of the method, apparatuses, and non-transitory computer-readable medium described herein may further include operations, features, means, or instructions for identifying that at least one of the first search space set or the second search space set may have a set of multiple monitoring occasions within the same time interval based on the first configuration and the second configuration and identifying an association between a monitoring occasion of the first search space set and a monitoring occasion of the second search space set during the time interval, where monitoring for the combined first physical downlink control channel candidate and the second physical downlink control channel candidate may be based on the association between the monitoring occasion of the first search space set and the monitoring occasion of the second search space set.

Some examples of the method, apparatuses, and non-transitory computer-readable medium described herein may further include operations, features, means, or instructions for identifying that at least one of the first search space set or the second search space set may have a set of multiple monitoring occasions within the same time interval based on the first configuration and the second configuration and identifying respective associations between each monitoring occasion of the first search space set and each monitoring occasion of the second search space set within the same time interval, where monitoring for the combined first physical downlink control channel candidate and the second physical downlink control channel candidate may be based on the respective associations.

Some examples of the method, apparatuses, and non-transitory computer-readable medium described herein may further include operations, features, means, or instructions for identifying a first number of monitoring occasions for the first search space set within the same time interval based on the first configuration, identifying a second number of monitoring occasions for the second search space set within the same time interval based on the second configuration, and identifying an association between one or more monitoring occasions of the first search space set and one or more monitoring occasions of the second search space set based on the second number of monitoring occasions for the second search space set being less than the first number of monitoring occasions for the first search space set, where monitoring for the combined first physical downlink control channel candidate and the second physical downlink control channel candidate may be based on the association between the one or more monitoring occasions of the first search space set and the one or more monitoring occasions of the second search space set, where the association may be based on the one or more monitoring occasions for the first search space set occurring before the one or more monitoring occasions for the second search space set, the one or more monitoring occasions for the first search space set occurring after the one or more monitoring occasions for the second search space set, or any combination thereof.

Some examples of the method, apparatuses, and non-transitory computer-readable medium described herein may further include operations, features, means, or instructions for identifying a linking configuration that indicates an association between one or more instances of the first search space set and one or more instances of the second search space set within the same time interval, where monitoring for the combined first physical downlink control channel candidate and the second physical downlink control channel candidate may be based on the linking configuration.

In some examples of the method, apparatuses, and non-transitory computer-readable medium described herein, monitoring for the first search space set and the second search space set may include operations, features, means, or instructions for identifying that the first search space set and the second search space set may be included in two or more respective time intervals and monitoring for the combined first physical downlink control channel candidate and the second physical downlink control channel candidate during the two or more respective time intervals based on identifying that the first search space set and the second search space set may be included in the two or more respective time intervals.

Some examples of the method, apparatuses, and non-transitory computer-readable medium described herein may further include operations, features, means, or instructions for identifying, based on the configuration, an association between a first monitoring occasion for the first search space set and a second monitoring occasion for the second search space set during the two or more respective time intervals, where monitoring for the combined first physical downlink control channel candidate and the second physical downlink control channel candidate may be based on the association the first monitoring occasion for the first search space set and the second monitoring occasion for the second search space set.

Some examples of the method, apparatuses, and non-transitory computer-readable medium described herein may further include operations, features, means, or instructions for identifying one or more parameters for monitoring for the first search space set and the second search space set, the one or more parameters including a combined monitoring occasion periodicity, a combined monitoring occasion offset, or any combination thereof, where combining the first physical downlink control channel candidate and the second physical downlink control channel candidate may be based on the one or more parameters.

Some examples of the method, apparatuses, and non-transitory computer-readable medium described herein may further include operations, features, means, or instructions for identifying an instance of the first monitoring occasion for the first search space set within a time interval of the two or more respective time intervals, identifying an offset from the instance of the first monitoring occasion, and identifying the second monitoring occasion for the second search space set based on the offset.

In some examples of the method, apparatuses, and non-transitory computer-readable medium described herein, a first control resource set associated with the first search space set and a second control resource set associated with the second search space set may be configured in a same serving cell.

In some examples of the method, apparatuses, and non-transitory computer-readable medium described herein, a first control resource set associated with the first search space set may be different than a second control resource set associated with the second search space set.

In some examples of the method, apparatuses, and non-transitory computer-readable medium described herein, a configured presence or absence of a first transmission configuration indicator field associated with downlink control information for the first control resource set may be the same as a configured presence or absence of a second transmission configuration indicator field associated with downlink control information for the second control resource set.

In some examples of the method, apparatuses, and non-transitory computer-readable medium described herein, a configured presence or absence of a first transmission configuration indicator field associated with downlink control information for the first control resource set may be different from a configured presence or absence of a second transmission configuration indicator field associated with downlink control information for the second control resource set and the method, apparatuses, and non-transitory computer-readable medium may include further operations, features, means, or instructions for determining that a transmission configuration indicator field associated with downlink control information for the combined first physical downlink control channel candidate and the second physical downlink control channel candidate may be present, the determination being based on the configured presence or absence of the first transmission configuration indicator field being different from the second transmission configuration indicator field.

In some examples of the method, apparatuses, and non-transitory computer-readable medium described herein, a transmission configuration indicator state for the first control resource set may be different for the second control resource set.

In some examples of the method, apparatuses, and non-transitory computer-readable medium described herein, a first control resource set associated with the first search space set may have a different pool index configuration as a second control resource set associated with the second search space set.

In some examples of the method, apparatuses, and non-transitory computer-readable medium described herein, a first control resource set associated with the first search space set may have a same pool index configuration as a second control resource set associated with the second search space set.

In some examples of the method, apparatuses, and non-transitory computer-readable medium described herein, the first search space set and the second search space set may have a same search space type.

In some examples of the method, apparatuses, and non-transitory computer-readable medium described herein, the first search space set and the second search space set may be configured for monitoring a same format of downlink control information.

In some examples of the method, apparatuses, and non-transitory computer-readable medium described herein, the first physical downlink control channel candidate may have a first aggregation level that may be different than a second aggregation level for the second physical downlink control channel candidate, and the first aggregation level and the second aggregation level may be from a same set of aggregation levels.

Some examples of the method, apparatuses, and non-transitory computer-readable medium described herein may further include operations, features, means, or instructions for combining the first physical downlink control channel candidate and the second physical downlink control channel candidate may be based on a capability of the UE, where a threshold number of combined physical downlink control channel candidates within a time interval may be based on the capability of the UE. A method of wireless communication at a base station is described. The method may include configuring an association between a first PDCCH candidate corresponding to a first search space set and a second PDCCH candidate corresponding to a second search space set and transmitting, to a user equipment, an indication of the association between the first PDCCH candidate and the second PDCCH candidate.

An apparatus for wireless communication at a base station is described. The apparatus may include a processor, memory coupled with the processor, and instructions stored in the memory. The instructions may be executable by the processor to cause the apparatus to configure an association between a first PDCCH candidate corresponding to a first search space set and a second PDCCH candidate corresponding to a second search space set and transmit, to a user equipment, an indication of the association between the first PDCCH candidate and the second PDCCH candidate.

Another apparatus for wireless communication at a base station is described. The apparatus may include means for configuring an association between a first PDCCH candidate corresponding to a first search space set and a second PDCCH candidate corresponding to a second search space set and transmitting, to a user equipment, an indication of the association between the first PDCCH candidate and the second PDCCH candidate.

A non-transitory computer-readable medium storing code for wireless communication at a base station is described. The code may include instructions executable by a processor to configure an association between a first PDCCH candidate corresponding to a first search space set and a second PDCCH candidate corresponding to a second search space set and transmit, to a user equipment, an indication of the association between the first PDCCH candidate and the second PDCCH candidate.

Some examples of the method, apparatuses, and non-transitory computer-readable medium described herein may further include operations, features, means, or instructions for identifying a set of parameters that indicate the association between the first PDCCH candidate and the second PDCCH candidate, and transmitting an indication of the set of parameters to the UE.

In some examples of the method, apparatuses, and non-transitory computer-readable medium described herein, identifying the set of parameters may include operations, features, means, or instructions for identifying respective sets of parameters for each combined PDCCH candidate of one or more combined PDCCH candidates.

In some examples of the method, apparatuses, and non-transitory computer-readable medium described herein, identifying the set of parameters may include operations, features, means, or instructions for identifying respective sets of parameters for each search space set pair of one or more search space set pairs.

In some examples of the method, apparatuses, and non-transitory computer-readable medium described herein, the set of parameters includes an indication of the first search space set associated with a first control resource set, an indication of the second search space set associated with a second control resource set, an index of the first PDCCH candidate, an index of the second PDCCH candidate, an aggregation level of the first PDCCH candidate, or an aggregation level of the second PDCCH candidate, or any combination thereof.

Some examples of the method, apparatuses, and non-transitory computer-readable medium described herein may further include operations, features, means, or instructions for identifying a first configuration for the first search space set, the first configuration indicating one or more monitoring occasions for the first search space set, identifying a second configuration for the second search space set, the second configuration indicating one or more monitoring occasions for the second search space set, and transmitting an indication of the first configuration and the second configuration to the UE.

Some examples of the method, apparatuses, and non-transitory computer-readable medium described herein may further include operations, features, means, or instructions for transmitting the first search space set and the second search space set during a same time interval based on the first configuration and the second configuration.

In some examples of the method, apparatuses, and non-transitory computer-readable medium described herein, each of the first search space set and the second search space set may have a single monitoring occasion within the same time interval based on the first configuration and the second configuration.

In some examples of the method, apparatuses, and non-transitory computer-readable medium described herein, at least one of the first search space set or the second search space set may have a set of monitoring occasions within the same time interval based on the first configuration and the second configuration, and where a monitoring occasion of the first search space set may be associated with a monitoring occasion of the second search space set during the same time interval.

In some examples of the method, apparatuses, and non-transitory computer-readable medium described herein, at least one of the first search space set or the second search space set may have a set of monitoring occasions within the same time interval based on the first configuration and the second configuration, and where each monitoring occasion of the first search space set may have a respective association with each monitoring occasion of the second search space set within the same time interval.

Some examples of the method, apparatuses, and non-transitory computer-readable medium described herein may further include operations, features, means, or instructions for identifying a first number of monitoring occasions for the first search space set within the same time interval based on the first configuration, and identifying a second number of monitoring occasions for the second search space set within the same time interval based on the second configuration, where one or more monitoring occasions of the first search space set may be associated with one or more monitoring occasions of the second search space set based on the second number of monitoring occasions for the second search space set being less than the first number of monitoring occasions for the first search space set.

In some examples of the method, apparatuses, and non-transitory computer-readable medium described herein, the association may be based on one or more monitoring occasions for the first search space set occurring before one or more monitoring occasions for the second search space set, the one or more monitoring occasions for the first search space set occurring after the one or more monitoring occasions for the second search space set, or any combination thereof.

Some examples of the method, apparatuses, and non-transitory computer-readable medium described herein may further include operations, features, means, or instructions for configuring a linking configuration that indicates an association between one or more instances of the first search space set and one or more instances of the second search space set within the same time interval, and transmitting an indication of the linking configuration to the UE.

Some examples of the method, apparatuses, and non-transitory computer-readable medium described herein may further include operations, features, means, or instructions for transmitting the first search space set and the second search space set during a during the two or more respective time intervals based on the first configuration and the second configuration.

Some examples of the method, apparatuses, and non-transitory computer-readable medium described herein may further include operations, features, means, or instructions for configuring an association between a first monitoring occasion for the first search space set and a second monitoring occasion for the second search space set during the two or more respective time intervals.

Some examples of the method, apparatuses, and non-transitory computer-readable medium described herein may further include operations, features, means, or instructions for configuring one or more parameters for monitoring for the first search space set and the second search space set, the one or more parameters including a combined monitoring occasion periodicity, a combined monitoring occasion offset, or any combination thereof, where the indication of the association includes the configured one or more parameters.

Some examples of the method, apparatuses, and non-transitory computer-readable medium described herein may further include operations, features, means, or instructions for configuring an instance of the first monitoring occasion for the first search space set within a time interval of the two or more respective time intervals, identifying an offset from the instance of the first monitoring occasion, and configuring the second monitoring occasion for the second search space set based on the offset.

In some examples of the method, apparatuses, and non-transitory computer-readable medium described herein, a first control resource set associated with the first search space set and a second control resource set associated with the second search space set may be configured in a same serving cell.

In some examples of the method, apparatuses, and non-transitory computer-readable medium described herein, a first control resource set associated with the first search space set may be different than a second control resource set associated with the second search space set.

In some examples of the method, apparatuses, and non-transitory computer-readable medium described herein, a configured presence or absence of a first transmission configuration indicator field associated with downlink control information for the first control resource set may be the same as a configured presence or absence of a second transmission configuration indicator field associated with downlink control information for the second control resource set.

In some examples of the method, apparatuses, and non-transitory computer-readable medium described herein, a configured presence or absence of a first transmission configuration indicator field associated with downlink control information for the first control resource set may be different from a configured presence or absence of a second transmission configuration indicator field associated with downlink control information for the second control resource set.

In some examples of the method, apparatuses, and non-transitory computer-readable medium described herein, a first control resource set associated with the first search space set may have a different pool index configuration as a second control resource set associated with the second search space set.

In some examples of the method, apparatuses, and non-transitory computer-readable medium described herein, the first search space set may be different than the second search space set.

In some examples of the method, apparatuses, and non-transitory computer-readable medium described herein, the first search space set and the second search space set may have a same search space type.

In some examples of the method, apparatuses, and non-transitory computer-readable medium described herein, the first search space set and the second search space set may be configured for monitoring a same format of downlink control information.

In some examples of the method, apparatuses, and non-transitory computer-readable medium described herein, the first PDCCH candidate may have a same aggregation level as the second PDCCH candidate.

In some examples of the method, apparatuses, and non-transitory computer-readable medium described herein, the first PDCCH candidate may have a first aggregation level that may be different than a second aggregation level for the second PDCCH candidate, where the first aggregation level and the second aggregation level may be from a same set of aggregation levels.

Some examples of the method, apparatuses, and non-transitory computer-readable medium described herein may further include operations, features, means, or instructions for combining the first PDCCH candidate and the second PDCCH candidate may be based on a capability of the UE.

In some examples of the method, apparatuses, and non-transitory computer-readable medium described herein, a maximum number of combined PDCCH candidate within a time interval may be based on the capability of the UE.

DETAILED DESCRIPTION

Figure 1:
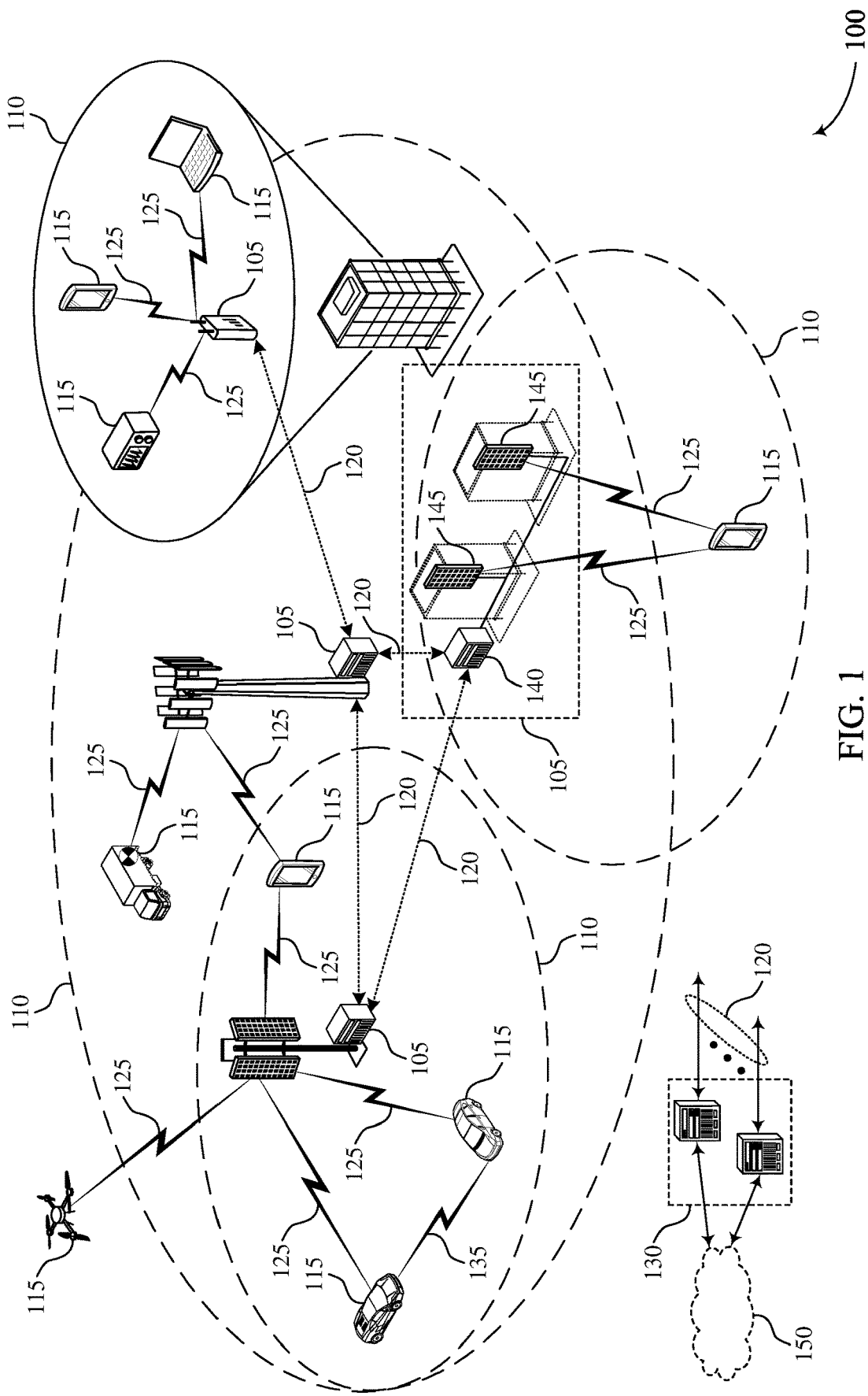
FIG. 1 illustrates an example of a system for wireless communications that supports linking search space sets for physical downlink control channel repetitions in accordance with aspects of the present disclosure.

Some wireless communication systems may support the repetition of various signals, such as control information or data. For example, data transmissions sent via physical downlink shared channel (PDSCH) may be repeated across different transmission configuration indicator (TCI) states and/or transmission/reception points (TRPs) within a system. In such cases, a device, such as a user equipment (UE), may receive the repetitions and combine multiple PDSCH transmissions/occasions (e.g., repetitions), which may serve to enhance reliability in the system and may also provide transmission diversity for protection against interference. While some wireless communications systems may include mechanisms that support the repetition of data (e.g., transmitted via PDSCH), mechanisms that similarly support the repetition of control information, such as via physical downlink control channel (PDCCH), may not be supported.

The repetition of control channels such as PDCCH may be complex due to the ways in which PDCCH is identified by a UE (e.g., by regularly monitoring search spaces for control information). Further, while the repetition of PDSCH transmissions may serve to enhance reliability and transmission diversity, reliability in the system may be achieved if all channels (e.g., including PDCCH) are similarly enhanced (such as through techniques that enable PDCCH repetitions). For example, the enhancement of a single channel may not guarantee the overall reliability of the system. Thus, a mechanism for PDCCH repetition may also serve to enhance reliability in the system and may also provide transmission diversity for protection against interference.

The described techniques relate to PDCCH repetitions and linking (e.g., associating) respective PDCCH candidates of different search space sets based on a fixed rule or a received configuration that links different search space sets among other examples. For example, control information transmitted via PDCCH may be repeated across the same or different TCI states by linking different PDCCH candidates of different search space sets. In some examples, the association between the PDCCH candidates and corresponding search space sets may be configured by a base station. The base station may indicate the linked relationship to a UE via radio resource control (RRC) signaling. The association between search space sets and corresponding PDCCH candidates may enable the UE to combine the candidates, where the UE may treat the respective PDCCH candidates as a combined PDCCH candidate, and may monitor the PDSCH candidate accordingly.

In some examples, various associations between respective search space sets may be used for identifying combined PDCCH candidates. For example, a monitoring occasion associated with a first search space set may be linked with a monitoring occasion of a second search space set that is in a same time interval (e.g., slot). Here, the first search space set and the second search space set may have one monitoring occasions within monitored slots, and a combined PDCCH candidate may be defined in slots in which both the first search space set and the second search space set are monitored. In other cases, one or more of the first search space set and the second search space set may have more than one monitoring occasions within monitored slots. In this case, monitoring occasions may be linked based on the occurrence of each search space set within the slot. As a non-limiting example, a first occurrence of the first search space set within a slot may be linked with a first occurrence of the second search space set within the slot. As described herein, different search space set associations for a combined PDCCH candidate may be possible within a slot based on the occurrence (or number of occurrences, order of occurrences, and so forth) of the first search space set and the second search space set.

In other examples, a monitoring occasion of a first search space set may be linked with a monitoring occasion of a second search space set that is in a same slot or in different slots. In this case, a rule may provide an associations of monitoring occasions between one or more time intervals (e.g., slots). In some cases, the linking of monitoring occasions may be explicitly defined as part of a linking configuration. For example, an occurrence of a first search space set within a slot may be linked (through a configuration) with an occurrence of a second search space set within a same or different slot.

In some examples, rules or restrictions for associating PDCCH candidates corresponding to the same or different search space sets may be defined. In some cases, a first search space set may be associated with a first control resource set (CORESET) and a second search space set may be associated with a second CORESET. In other examples, the combined candidates may be indicated based on associated search space sets and aggregation levels of the individual candidates. In some examples, a UE may monitor a set of linked PDCCH candidates indicated by the base station as well as other PDCCH candidates that are not associated with each other. Additionally, the UE may determine to perform combining of the PDCCH candidates based on a capability of the UE.

Aspects of the disclosure are initially described in the context of wireless communications systems. Further examples are then provided that illustrate combined PDCCH candidates and associations between search space sets. Aspects of the disclosure are further illustrated by and described with reference to apparatus diagrams, system diagrams, and flowcharts that relate to linking search space sets for PDCCH repetitions.

FIG. 1 illustrates an example of a wireless communications system 100 that supports linking search space sets for PDCCH repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (JAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (of) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2-N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a base station 105 may transmit data via physical downlink shared channel (PDSCH) and may be repeat the data transmission. A UE 115 may receive the repetitions and may combine the multiple PDSCH repetitions, which may serve to enhance reliability and provide transmission diversity in the wireless communications system. Additionally, a mechanism that supports the repetition of control information via PDCCH may provide further enhanced reliability and diversity in the system.

The wireless communications system 100 may support the use of combined PDCCH candidates for PDCCH repetitions. For instance, a UE 115, may receive a configuration via RRC signaling from a base station 105, where the configuration may indicate to the UE 115, an association between a first PDCCH candidate and a second PDCCH candidate or between a first search space set and a second search space set, or both. In some cases, the first PDCCH candidate may correspond to a first search space set while the second PDCCH candidate may correspond to a second search space set. In some cases, the UE 115 may determine an association between the first PDCCH candidate in the first search space set and the second PDCCH candidate in the second search space set based on a fixed rule. In some cases, based on the received configuration or another configuration such as a second received configuration or a fixed rule, the UE 115 may identify a set of parameters that indicate the association between the first PDCCH candidate and the second PDCCH candidate. Such parameters may include an indication of the first search space set associated with a first control resource set, an indication of the second search space set associated with a second control resource set, an index of the first PDSCH candidate, an index of the second PDSCH candidate, an aggregation level of the first PDCCH candidate, or an aggregation level of the second PDCCH candidate, or the like. A UE 115 may monitor the first and second search space set based on the identified parameters. The UE 115 may combine the first PDCCH candidate with the second PDCCH candidate monitored in the first search space set and the second search space set based on capabilities of the UE and the identified set of parameters. The UE 115 may further determine to decode the combined PDCCH candidate(s).

Figure 2:
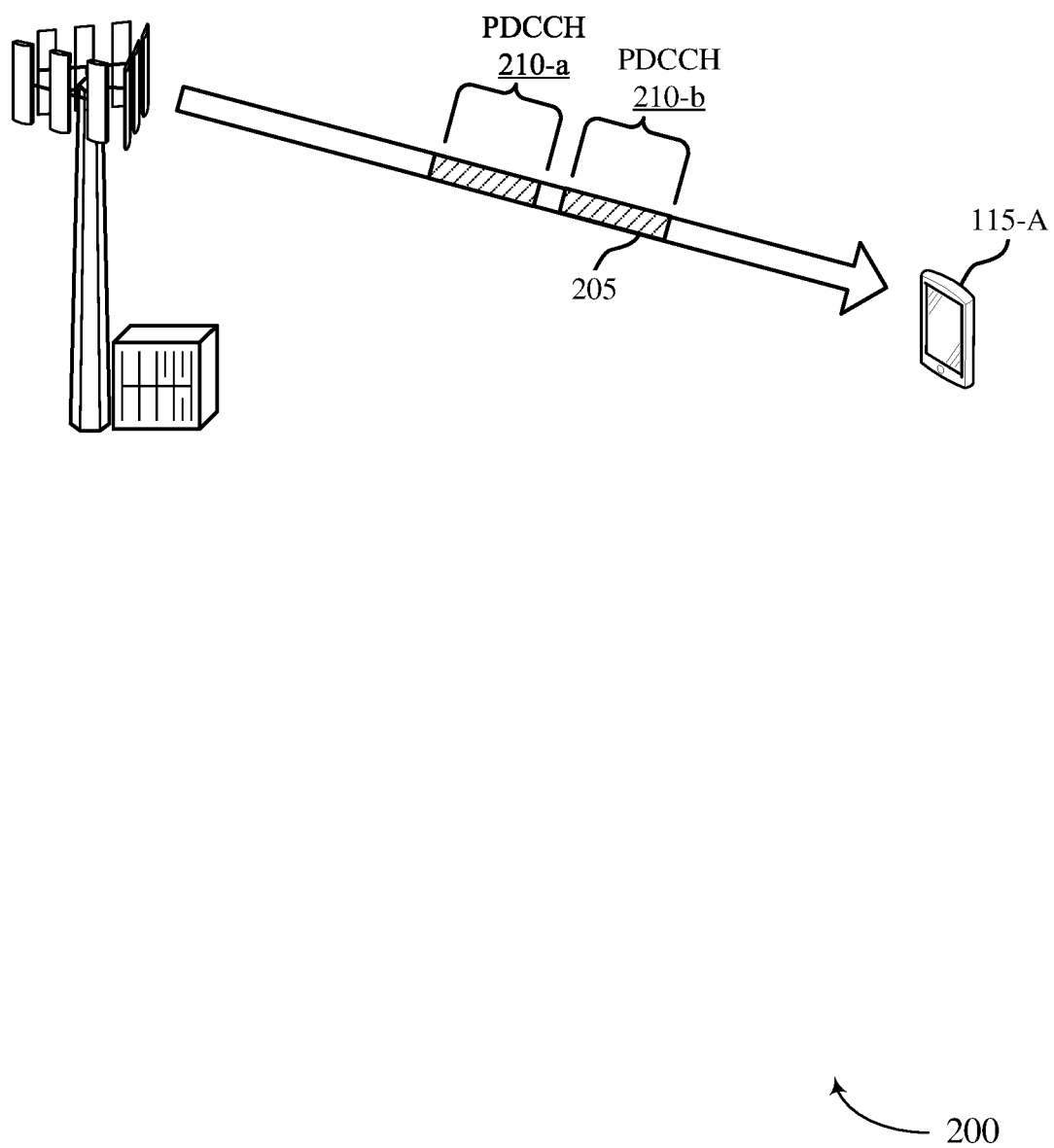
FIG. 2 illustrates an example of a wireless communications system that supports linking search space sets for PDCCH repetitions in accordance with aspects of the present disclosure.

FIG. 2 illustrates an example of a wireless communications system 200 that supports linking search space sets for PDCCH repetitions in accordance with aspects of the present disclosure. In some examples, wireless communications system 200 may implement aspects of wireless communications system 100. For instance, wireless communications system 200 includes base station 105-a, which may be an example of a base station 105 described with reference with FIG. 1. Wireless communications system 200 also includes UE 115-a, which may be an example of a UE 115 described with reference to FIG. 1. In some examples, the wireless communications system 200 may implement aspects of the wireless communications system 100. For example, base station 105-a in the wireless communications system 200 may implement communications by linking two search space sets for PDCCH repetition. Wireless communications system 200 may also support the combining of PDCCH candidates by the UE 115-a.

As described herein, repetition of PDCCH candidates (e.g., monitoring occasions) may be implemented by base station 105-a and UE 115-a. Additionally, there may be various repetition schemes for PDSCH across different TCI states or across different TRPs, which may be used in combination with the described schemes for PDCCH repetitions across different TCI states or across different TRPs. In some cases, a UE 115-a may combine (e.g., link) multiple (e.g., two) PDCCH transmission occasions (e.g., monitoring occasions, PDCCH candidates). For example, a first PDCCH 210-a and a second PDCCH 210-b may be transmitted to a UE 115-a via downlink transmission 205. PDCCH 210-a and PDCCH 210-b may each be associated with different search space sets. The multiple (e.g., two) search space sets may be associated with different CORESETs, and the different CORESETS may be associated with different TCI states. Further, the base station 105-a may indicate (e.g., via a configuration sent via RRC signaling) to the UE 115-a that the PDCCH 210-a and PDCCH 210-b are linked or associated with each other or that the associated search space sets are linked or associated with each other.

The UE 115-a may determine to combine PDCCH 210-a and 210-b based on the linked relationship. In some cases, repetitions of PDCCH may be in time, frequency, or in different layers of wireless communications system 200. In addition, repetitions of PDCCH 210 may be overlapping (e.g., completely overlapping), non-overlapping (e.g., completely non-overlapping), or partially overlapping in the time and/or frequency domain. Information transmitted from the base station 105-a (e.g., DCI) may indicate the scheduling parameters for repetitions of the PDCCH 210-a and 210-b, which may occur across different TCI states. In some cases, for each PDCCH 210-a and 210-b (e.g., repetition), the base station 105-a may transmit DCI that may indicate scheduling information. Further, parameters such as parameters for CORESETs (e.g., including TCI state information, CCE-REG mapping information, or the like), an association between respective search space sets for a combined PDCCH candidate, parameters for search space sets, and linkage information for associations may be configured via RRC signaling, or may be indicated via a medium access control (MAC) control element (MAC-CE) (e.g., a MAC-CE for TCI state activation for a CORESET). As such, the parameters may provide configurations used for transmitting a combined PDCCH candidate (and combined DCI).

In some cases, the described implementation of PDCCH repetition may enhance system reliability and may enable diversity across different TCI states, which, in turn, may homogenize reliability for multiple channels of the system. The implementation of PDCCH repetition may include mechanisms for linking PDCCH candidates, defining linking relationships and combining linked candidates by the UE 115-a. PDCCH repetitions (e.g., PDCCH candidates) may be linked across different TCI states via linking across different search space sets which may allow the UE 115-a to combine the linked candidates.

A set of physical resources and a set of parameters may be used to transmit PDCCH and/or DCI, which may be defined for a given UE 115 (e.g., UE 115-a), which may be transmitted within a CORESET. For example, the UE 115-a may be configured with a number of CORESETs in a given BWP and may also be configured with a number of associated search space set where each search space set may have a different number of candidates of the PDCCH 210 for a given aggregation level. Each COREST may have a particular configuration. The configuration may include a TCI state for a given repetition of PDCCH 210 and may also indicate that TCI is present in the DCI (e.g., whether the scheduling DCI for a CORESET includes the TCI field for indicating the TCI state of PDSCH).

The configuration may further include the number of resource blocks (RBs) in a CORSET frequency domain, and the number of symbols in the CORESET (e.g., a CORESET may include 1, 2, or 3 orthogonal frequency-division multiplexing (ODFM) symbols). Each CORESET configuration may also include a control channel element resource element group mapping (CCE-REG), where a resource element group (REG) bundle may be indicated. CCE to REG mapping may be interleaved or may not be interleaved. Precoding granularity may also be included in the CORESET and may be contiguous for wideband channel estimation or may be equal to one REG bundle (e.g., a number of REGs that are bundled together). The CORESET configuration may also include a scrambling identity (ID). The scrambling ID may be used for scrambling a demodulation reference signal (DMRS) of the PDCCH and may also be used to scramble coded bits of the DCI. Further, a coresetpoolindex parameter may be defined and configured in some implementations and may have a value of 0 or 1. The coresetpoolindex may be used to group CORESETS into sets. For example, in a group of five CORESET configurations, three may have a coresetpoolindex of 0 and two may have a coresetpoolindex of 1. In some examples, the coresetpoolindex may be similar to a TRP identify in relation to other wireless communications systems.

Using the described techniques, UE 115-a may monitor combined PDCCH candidates similarly to individual PDCCH candidates, where monitoring may be based on associated search spaces set in which a combined PDCCH candidate is located. For example, UE 115-a may be configured with up to 10 search space sets in a given BWP that may each have a number of properties. For example, each search space set may be associated with one CORESET and may associate a search space set with the CORESET ID. Further, each search space set may have a number of monitoring occasions for PDCCH 210 and the symbols and slots in which the search space set exists may be defined.

There may be several parameters that define the monitoring occasions of a search space set. For example, parameters may include the periodicity of monitoring occasions (e.g., how may and when monitoring occasions occur in a slot), the starting symbol of monitoring occasions in a slot, and offset in units of slots to determine which slots are those that have that search space set. In some cases, a search space set may be specific to the UE 115-*a* or may be common to multiple UE 115. Search space set may also configured to monitor some DCI formats of a number of different DCI formats. A search space set may also be configured with a number of candidates for each aggregation level in the search space set. As a non-limiting example, there may be two candidates for a first aggregation level and ten candidates for a second aggregation level. Further CCEs of a PDCCH candidate with a particular aggregation level in a search space set may be defined based on the parameters of the search space set configuration.

The base station 105-*a* may transmit the search space set configuration to the UE 115-*a* in an RRC configuration. The base station 105-*a* may also transmit multiple PDCCH repetitions including, for example, PDCCH 210-*a* and PDCCH 210-*b* to the UE 115-*a* based on the configuration. PDCCH 210-*a* may be associated with a first search space set and PDCCH 210-*b* may be associated with a second search space set that is different from the first search space set. In other cases, the search space sets may be the same. Base Station 105-*a* may additionally indicate to the UE 115-*a* that the PDCCH 210-*a* and 210-*b* are linked or associated and may communicate the linking via RRC signaling. The UE 115-*a* may receive the PDCCH repetitions 210-*a* and 210-*b* as part of a downlink transmission 205, and the UE 115-*a* may combine the repetitions based on the linking relationship indicated by the base station 105-*a*. In some cases, the use of combined PDCCH candidates may be based on a capability of the UE 115-*a*. In some cases, there may be parameters that restrict the linking of PDCCH 210-*a* and 210-*b*. In some cases, a first CORESET may be associated with the first search space set and a second CORESET may be associated with a second search space set and may be configured in the same downlink serving cell and may not be in different component carriers if the monitoring occasions of the two search space set are to be linked. In some cases, the first search space set and the second search space set may correspond to a same scheduled cell in a cross-carrier scheduling scheme. In some cases, one CORESET may have different properties than another CORESET.

The TCI state for each PDCCH may be a property specific to the CORESET. For example, different CORESETs may have different TCI states. In some cases, the CORESETs may have the same properties but the associated search space set may not have the same properties. The field TCI-presentinDCI may be the same for both CORESETs and may be configured for both, or may not be configured for either. In cases where TCI-presentinDCI is sent to "enable" for at least one CORESET (e.g., i or j), DCI (e.g., DCI format 1_1) carried in the combined PDCCH may include a TCI field. As such, in other cases where TCI-presentinDCI is different for the CORESETs (present for CORESET i, absent for CORESET j, or vice versa), the UE 115-*a* may assume that the TCI field is present in the DCI corresponding to the combined PDCCH candidate.

Additionally or alternatively, the configuration of a CORESETpoolindex field may be different between the first and second CORESET or may be the same. In either case, CORESETpoolindex may be consistent in a system (e.g., always different between CORESETs, or always the same). In some cases, the search space set with which each candidate is associated may be different (e.g., linking candidates with a same search space set may not be supported), but may have the same search space set type (e.g., UE-specific, common, etc.) and may be configured to monitor the same DCI formats or may be configured to have at least one common DCI format.

In some examples, to link two PDCCH candidates, the aggregation levels may be the same. For example, in some cases, combining candidates of different aggregation levels may not be possible. In some cases, (e.g., aggregation levels 4, 8, 16) candidates from different aggregation levels may be combined. Further, a threshold (e.g., maximum) number of combined PDCCH candidates within a slot may be indicated as part of a capability signaling of UE 115-*a*. In some cases, all or a subset of the above parameters may be implemented as part of a linking determination by the base station 105-*a* and may be transmitted to the UE 115-*a* via RRC signaling and may further indicate linked PDCCH candidates from different search space sets to the UE 115-*a*.

Figure 3:
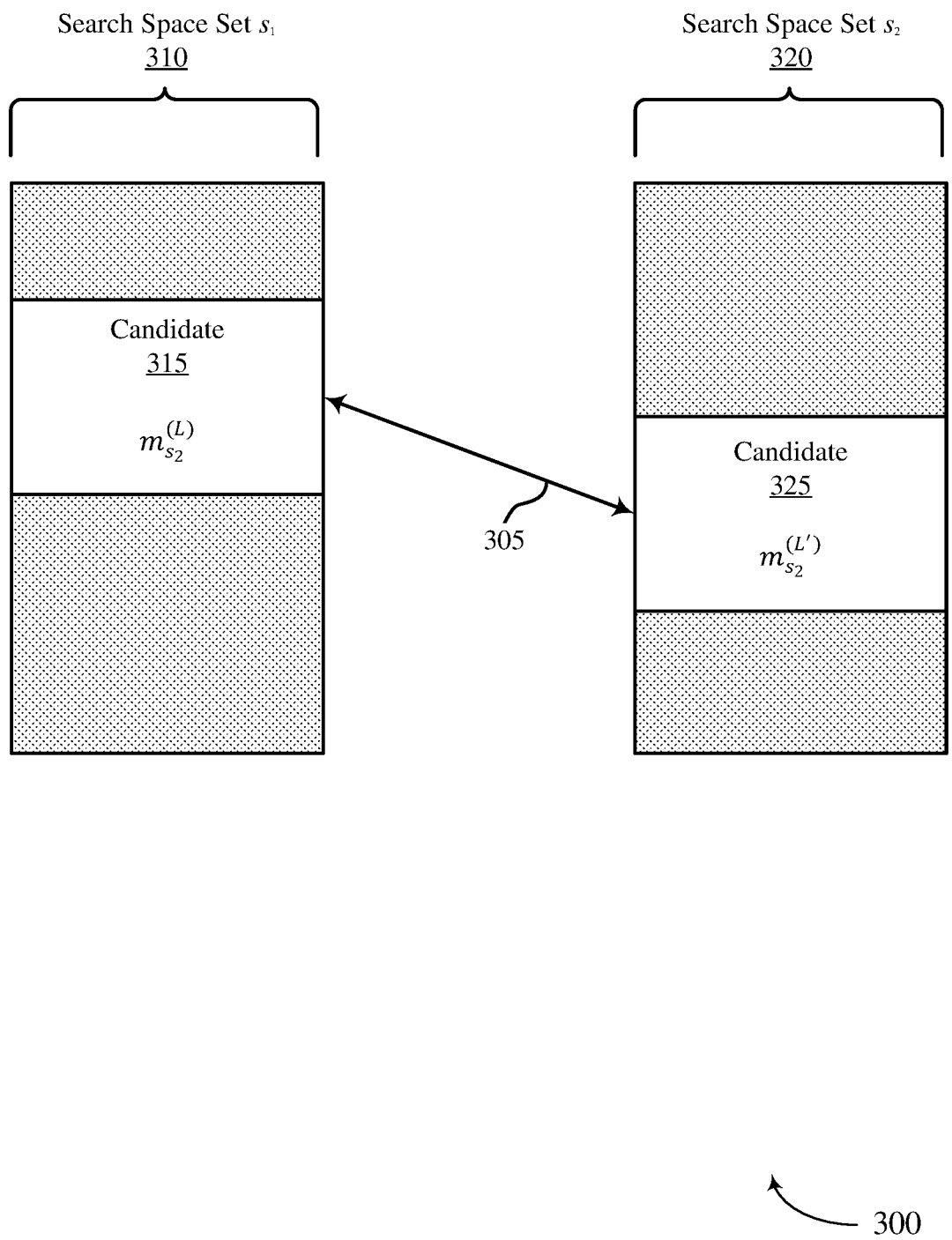
FIG. 3 illustrates an example of an association between PDCCH candidates that supports linking search space sets for PDCCH repetitions in accordance with aspects of the present disclosure.

FIG. 3 illustrates an example of an association between PDCCH candidates 300 that supports linking search space sets for PDCCH repetitions in accordance with aspects of the present disclosure. In some examples, the association between PDCCH candidates 300 may implement aspects of wireless communications systems 100 and 200. For example, the association between PDCCH candidates 300 may be configured by a base station 105 and signaled to a UE 115. The association between PDCCH candidates 300 may include a first search space set 310, a second search space set 320, a first PDCCH candidate 315, a second PDCCH candidate 325, and an association 305.

A base station 105 may link or associate PDCCH candidates across different search space set and may use a set of rules to define the linking. Additionally or alternatively, the base station 105 may link or associate different search space set and may use a set of rules to define the linking. For example, a rule may define a potential association between two different PDCCH candidates in different search space sets. A first PDCCH candidate 315 may be associated with a CORESET_i that has a TCI state 1 and a second PDCCH candidate may be associated with a CORESET_j that has a TCI state 2. Further, first search space set 310 and second search space set 320 may have, for a given aggregation level, a number of PDCCH candidates 315. A first PDCCH candidate 315 may be represented by a candidate index, $m_{s_1}^{(L)}$, with an aggregation level L in the first search space set 310. Similarly, a second PDCCH candidate 325 may be represented by a candidate index, $m_{s_2}^{(L')}$, with an aggregation level L' in a second search space set 320.

A UE 115 may be configured with a combined PDCCH candidate using these parameters. For example, first search space set 310 includes PDCCH candidate 315 and for the specific aggregation level, L, candidate 315 of search space set 310 may be linked with candidate 325 of second search space set 320. For example, $m_{s_2}^{(L')}$ and $m_{s_1}^{(L)}$ may include a matrix of multiple candidate entries that may tie candidates of first search space set 310 to candidates of second search space set 320 for different aggregation levels.

In some examples, the parameters $s_1$, $s_2$, L, L', $m_{s_1}^{(L)}$, $m_{s_2}^{(L')}$ may be configured via RRC signaling to establish the association between the first candidate 315 and the second candidate 325. In some cases, there may be multiple combinations of $s_1$, $s_2$, L, L', $m_{s_1}^{(L)}$, $m_{s_2}^{(L')}$ and each combination may correspond to a single combined PDCCH candidate. In other cases, for a pair of search spaces (e.g., $s_1$, $s_2$), there may be multiple combinations for each combined PDCCH candidate.

The UE 115 may monitor each potential PDCCH candidate (e.g., PDCCH candidate 315) in the first search space set 310 and in the second search space set 320 (e.g., PDCCH candidate 325). In addition, a UE 115 may monitor associated PDCCH candidates 315 and 325 and may determine to perform a combining of the candidates 315 and 325 based on a UE capability. In some cases, a UE 115 may not combine candidates 315 and 325 but may have identified the set of parameters defining the association 305 between the candidates 315 and 325. A UE 115 may decode one of the candidates 315 or 325 and may determine that the combined PDCCH candidate is also decoded or may determine to combine candidate 315 and candidate 325 based on the capability of the UE 115. In some cases, a UE 115 may send a signal to a base station that includes an indication of combining and or UE capability. The base station may set an association in RRC signaling or may send the configuration in DCI based on the indication.

Figure 4:
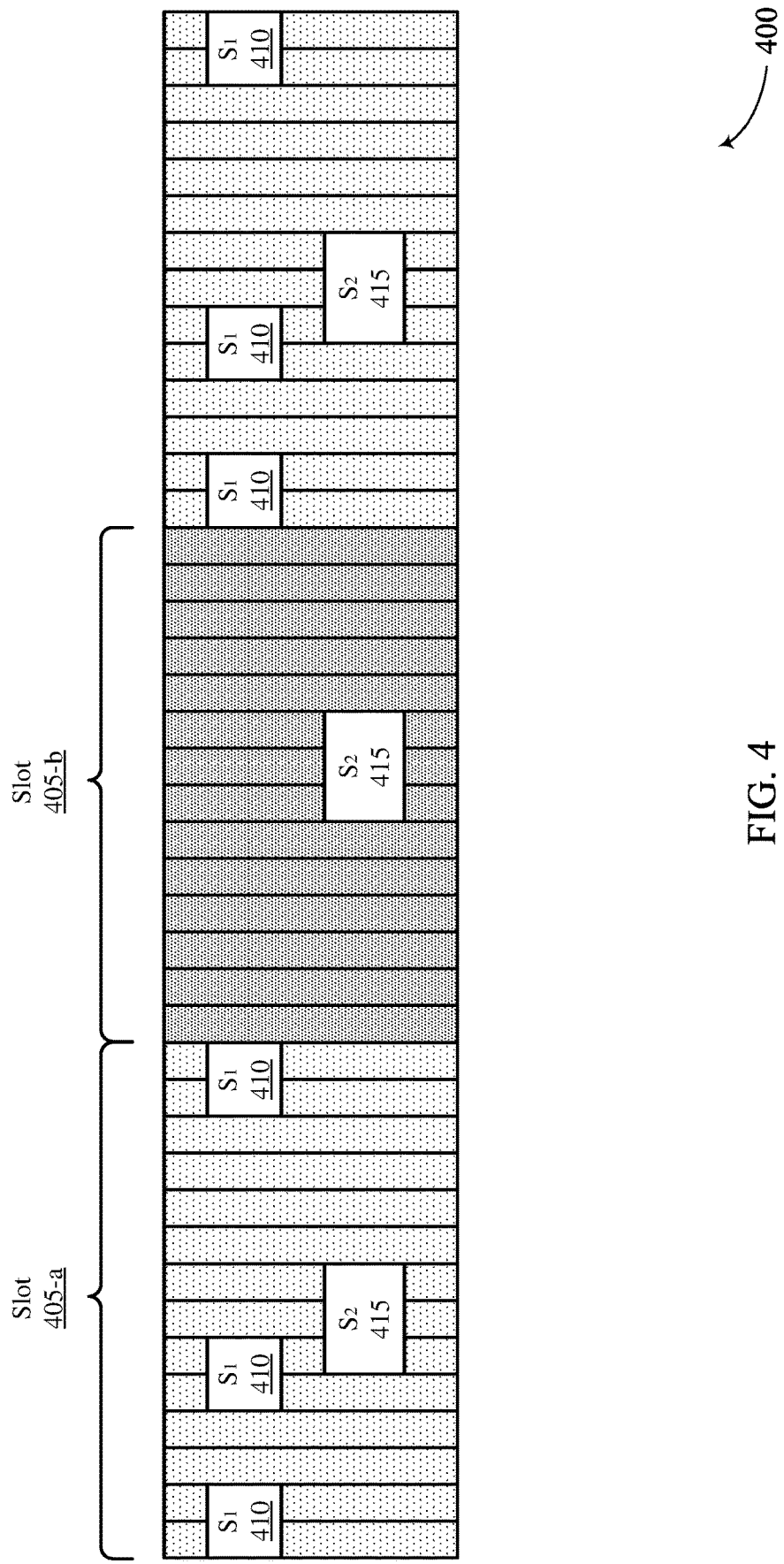
FIG. 4 illustrates an example of monitoring occasions in a system that supports linking search space sets for PDCCH repetitions in accordance with aspects of the present disclosure.

FIG. 4 illustrates an example of monitoring occasions 400 in a system that supports linking search space sets for PDCCH repetitions in accordance with aspects of the present disclosure. In some examples, The monitoring occasions 400 may implement aspects of wireless communications systems 100 and 200. In some cases, monitoring occasions 400 may include a slot 405, multiple instances of a first search space set 410, and multiple instances of a second search space set 415.

A slot 405 may be monitored for PDCCH candidates and may be configured with multiple monitoring occasions (e.g., repetitions) of a first search space set 410 and a second search space set 415. In some cases, a slot 405 may include multiple monitoring occasions of the first search space set 410, but may include a single monitoring occasion of second search space set 415, or vice versa. In some cases, there may be no instances of a monitoring occasion of a first search space set 410 and there may be one or multiple monitoring occasions of the second search space set 415, or vice versa. Additionally there may be multiple monitoring occasions of both the first search space set 410 and the second search space set 415. In some cases, first search space set 410 may have a separate configuration than second search space set 415, which may include a configuration of a slot periodicity and offset (e.g., according to a monitoringSlotPeriodicity-AndOffset parameter), duration, and starting symbols (e.g., temporally first symbols) of the monitoring occasions per slot 405 (e.g., according to a monitoringSymbolsWithinSlot parameter) to determine the monitoring occasions in the time domain.

To combine PDCCH candidates in accordance with the described techniques, a UE 115 may use information regarding which occurrence in time of the first search space set 410 is associated with which occurrence in time of the second search space set 415. This information may be provided via RRC signaling from the base station. As such, there may be various implementations in which candidates are linked or associated. In some cases, a monitoring occasion of the first search space set 410 may be linked with a monitoring occasion of the second search space set 415 when they are in the same slot, such as discussed with reference to FIGS. 5A, 5B, 5C, and 5D. In other examples, a monitoring occasion of the first search space set 410 may be linked with a monitoring occasion of the second search space set 415 when they are in the same or different slots, such as discussed with reference to FIG. 6.

FIGS. 5A, 5B, 5C, and 5D illustrate examples of associations between search space sets 500-*a*, 500-*b*, 500-*c*, and 500-*d*, respectively, in a system that supports linking search space sets for PDCCH repetitions in accordance with aspects of the present disclosure. In some examples, The associations between search space sets 500-*a*, 500-*b*, 500-*c*, and 500-*d*, may implement aspects of wireless communications systems 100 and 200. The associations between search space sets 500-*a*, 500-*b*, 500-*c*, and 500-*d* may each illustrate various configurations that may be used to associate or link respective search space sets (e.g., $s_1$, $s_2$) to each other. It is noted that the described examples of associations between search space sets are provided as illustrative examples, and different or other associations and configurations may be possible. For instance, a slot may include a different number or configuration of respective search space sets which may each be linked in various ways with one or more other search space sets.

The associations between search space sets 500-*a*, 500-*b*, 500-*c*, and 500-*d* may each include (e.g., within a slot) a first monitoring occasion of a first search space set 510-*a*, second monitoring occasion of a first search space set 510-*b*, and a third monitoring occasion of a first search space set 510-*c*. Each of the associations between search space sets 500-*a*, 500-*b*, 500-*c*, and 500-*d* may further include a first monitoring occasion of a second search space set 515-*a*, and a second monitoring occasion of a second search space set 515-*b* within a slot. Each of the associations may indicate linking relationships based on an aggregation level and candidate index shared by the potential candidates.

In some examples (not shown), a UE 115 may monitor one or more slots that each include one monitoring occasion for a first search space set 510 and one monitoring occasion for a second search space set 515. For example, a slot may include one monitoring occasion for a first search space set 510 and one monitoring occasion for a second search space set 515. A UE may identify a combined PDCCH candidate based on the first search space set 510 and the second search space 515 set occurring in the same slot. A combined PDCCH candidate for a given aggregation level pair and candidate index pair may be defined in slots in which both the first search space set 510 and the second search space set 515 are monitored.

In another example, the UE 115 may monitor one or more slots that include more than one monitoring occasion for each of the first and second search space sets. In slots where both the first search space set 510 and the second search space set 515 are monitored, one or more combined PDCCH candidates may be defined for a given aggregation level pair and candidate index level pair.

Figure 5A:
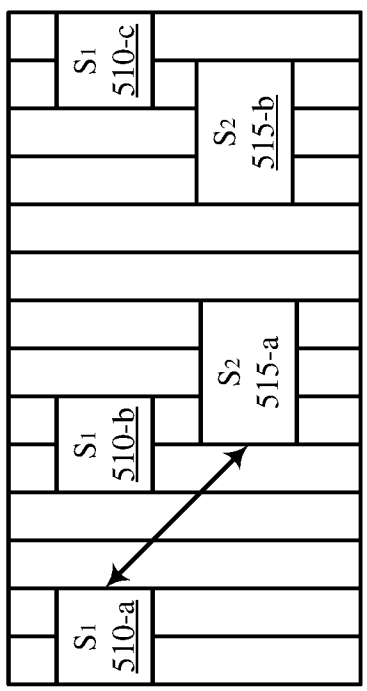
FIGS. 5A, 5B, 5C, and 5D illustrate examples of associations between search space sets in a system that supports linking search space sets for PDCCH repetitions in accordance with aspects of the present disclosure.

Additionally or alternatively, and as shown in FIG. 5A, there may be one combined PDCCH candidate per slot. As shown, the first monitoring occasion of the first search space set 510-*a* may be linked with the first monitoring occasion of the second search space set 515-*a* of the monitored slot based on a defined relationship. Additionally or alternatively, the last monitoring occasion of the first search space set 510-*a* may be linked with the last monitoring occasion of the second search space set 515-*a* based on a similar relationship. Other combinations of the respective first search space set 510 and second search space set 515 may be possible.

Figure 5B:
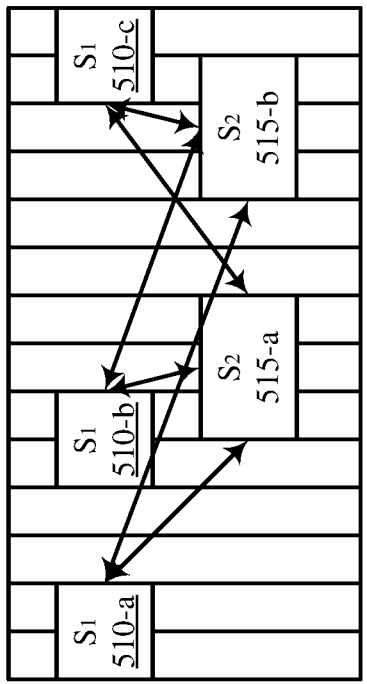

FIG. 5B shows an example association between search space sets 500-*b* where each monitoring occasion of the first search space set 510 may be linked with each monitoring occasion of the second search space set 515. For example, the first monitoring occasion of the first search space set 510-*a* may be linked with both the first and second monitoring occasions of the second search space set, 515-*a* and 515-*b*. Further, the first monitoring occasion of the second search space set 515-*a* may be linked with the first, second and third, monitoring occasions of the first search space set, 510-*a*, 510-*b*, and 510-*c*, and so on and so forth. In the particular example of FIG. 5B, there may be a potential for six different combined PDCCH candidates for a given aggregation level and for a candidate index pair. In other examples, there may be more or fewer combined PDCCH candidates based on the number of monitoring occasions of the first and second search space set.

Figure 5C:
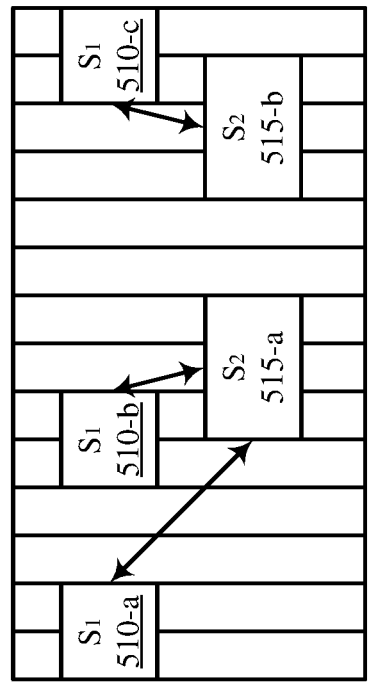

FIG. 5C shows an example association between search space sets 500-*c* where each monitoring occasion of the search space set with a number of (e.g., fewest) total monitoring occasions in the monitored slot is linked with one monitoring occasion of the other search space set in the monitored slot. For example, the association between search space sets 500-*c* includes first, second, and third occurrences of the first search space set 510-*a*, 510-*b*, and 510-*c* and first and second occurrences of second search space set 515-*a*, and 510-*b*. Since the second search space set has fewer monitoring occasions each monitoring occasion of the second search space set 515-*a* and 515-*b* may be linked with one of the three monitoring occasions of the first search space set 510-*a*, 510-*b*, or 510-*c*. Linking may be based on proximity of one or more monitoring occasion to another (e.g., in the time domain), or based on the occurrence of the monitoring occasion of one being either before or after the other monitoring occasion (e.g., where before and after may be defined with respect to the first or last symbol for a monitoring occasion). In this case, the second occurrence of the first search space set 510-*b* is linked with the first occurrence of the second search space set 515-*a* because it may be closest to the first occurrence of the second search space set 515-*a* in time. Alternatively, linking may be based on the first monitoring occasion that occurs after or before the first or last monitoring occurrence for the search space set with fewer monitoring occurrences, where before and after may be determined based on a temporally first occurrence, or the occurrence of a monitoring occasion of the search space set with the greater number of monitoring occasions.

Figure 5D:
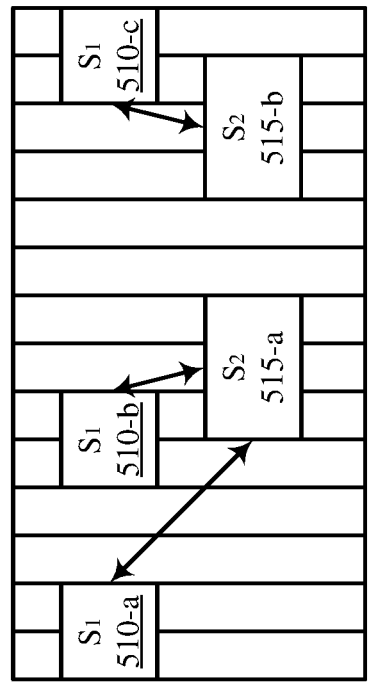

FIG. 5D shows an example association between search space sets 500-*d* where the linking relationship is explicitly defined as part of a linking configuration. One or multiple pairs may be linked from a single occasion. For example, the first monitoring occasion of the second search space set 515-*a* may be linked with both the first and second monitoring occasions of the first search space set 510-*a*, and 510-*b* based on the explicitly defined linking configuration. Similarly, the second monitoring occurrence of the second search space set 515-*b* may be linked with the third monitoring occasion of the first search space set 510-*c*. The first monitoring occurrence of the second search space set 515-*a* may be linked with two monitoring occasions of the first search space set while the second monitoring occasion of the second search space set 515-*b* may be linked with one monitoring occasion of the first search space set based on the explicitly defined rule.

Figure 6:
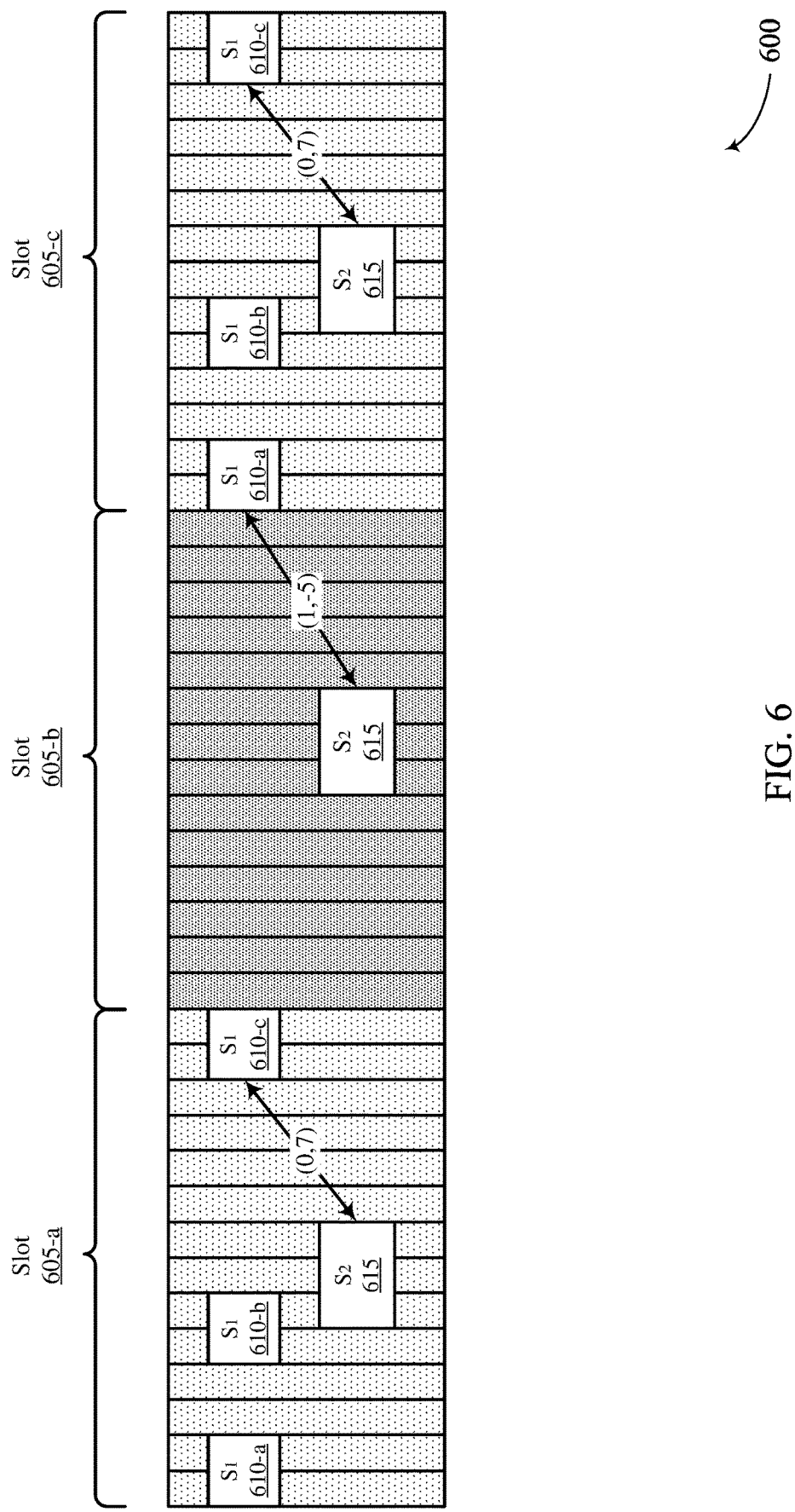
FIG. 6 illustrates an example of an association between search space sets in a system that supports linking search space sets for PDCCH repetitions in accordance with aspects of the present disclosure.

FIG. 6 illustrates an example of an association between search space sets 600 in a system that supports linking search space sets for PDCCH repetitions in accordance with aspects of the present disclosure. In some examples, the association between search space sets 600 may implement aspects of wireless communications systems 100 and 200. The association between search space sets illustrate various configurations that may be used to associate or link respective search space sets (e.g., $s_1$, $s_2$) to each other when such associations are configured across one or more slots 605.

The association between search space sets 600 may include a first slot 605-*a*, a second slot 605-*b*, and a third slot 605-*c*, where each slot 605 may represent example configurations for linking search space sets for PDCCH repetition. First slot 605-*a* may include a first monitoring occasion of a first search space set 610-*a*, a second monitoring occasion of the first search space set 610-*b*, and a third monitoring occasion of the first search space set 610-*c*. Further, slot 605-*a* may include a monitoring occasion of a second search space set 615. Likewise, slot 605-*c* may include a first monitoring occasion of the first search space set 610-*a*, a second monitoring occasion of the first search space set 610-*b*, and a third monitoring occasion of the first search space set 610-*c*. Slot 605-*c* may also include a monitoring occasion of a second search space set 615. Slot 605-*b* may include a monitoring occasion of the second search space set 615, but, in some examples, may not include monitoring occasions for the first search space set. The examples show in slots 605-*a*, 605-*b* and 605-*c*, should not be considered limiting examples, as there may be more, fewer, or no monitoring occurrences of the first and second search space set based on the configuration of each slot and the repetitions of monitoring occasions within each slot (e.g., based on a slot periodicity and offset and/or monitoring symbols within a time interval).

In some examples, a monitoring occasion of the first search space set may be linked with a monitoring occasion of the second search space set that is in a same slot 605. For example, a first monitoring occasion of a particular search space set (e.g., monitoring occasion for second search space set 615) in a first slot (e.g., slot 605-*b*) may be linked with a first monitoring occasion of a different search space set (e.g., 610-*a*) in a second slot (e.g., slot 605-*c*). In other examples, a monitoring occasion of the first search space set may be linked with a monitoring occasion of the second search space set that is in a same slot 605. For example, a first monitoring occasion of a particular search space set (e.g., monitoring occasion for second search space set 615) in a slot (e.g., slot 605-*a*) may be linked with a third monitoring occasion of a different search space set (e.g., 610-*c*). A rule to define linking relationships that is more flexible (e.g., as compared to the rules described with reference to FIG. 5) may be used, and linking relationships may be explicitly defined. More specifically, the first search space set and the second search space set may each have various parameters (e.g., periodicity, offset, number of monitoring occasions within a slot) that define the monitoring occasions within each search space set (e.g., $s_1$, $s_2$). The parameters may be defined for individual PDCCH candidates (e.g., monitoring occasions) and may be differently defined for combined PDCCH candidates. For example, a combined PDCCH candidate may be defined when two search space set have monitoring occasions are aligned with the defined parameters of the combined PDCCH candidate. For example, the parameters of one of the monitoring occasions of one of the search space set may be used as a reference and a configuration linking two monitoring occasions (e.g., PDCCH candidates) may be defined. For example, a delta configuration may be defined in terms of the slot difference between monitoring occasions and the number of symbols within the slots with respect to the start symbols of each occasion.

As described, monitoring occasions may be linked between different slots 605, where the linking may be defined by a position of the monitoring occasions within the respective slots and the slot in which each monitoring occasion occurs. In the example configuration of FIG. 6, the monitoring occasions of the second search space set may be used as the reference monitoring occasions. The linking may be represented by a delta configuration, where two combined PDCCH candidates may be defined in terms of (number of slots, number of symbols within the slots), or some other notation. Here, the first term of the delta configuration may be determined by the slots in which the linked monitoring occasions occur. For example, in the case of the monitoring occasion of the second search space set 615 in slot 605-b and the first monitoring occasion of the first search space set 610-a in slot 605-c, the configured association between search space sets may be represented in terms of (number of slots, number of symbols within the slots)=(1, −5). For instance, as the monitoring occasion of the second search space set 615 occurs in the second slot 605-b and the first monitoring occasion of the first search space set 610-a occurs within the third slot 605-c, the first term of the respective delta configuration (e.g., the number of slots) may be 1. The second term of the delta configuration (e.g., the number of symbols within the slot) is determined by the difference in slots between the first symbol of the reference monitoring occasion and the first symbol of the linked monitoring occasion. In this case, the monitoring occasion of the second search space set 615 in slot 605-b may begin in the 5th symbol of slot 605-b and the first monitoring occasion of the first search space set 610-a in slot 605-c may begin in the 0th symbol of slot 605-c. Therefore, the second term of the respective delta configuration in the provided example is −5 (0-5=−5).

Monitoring occasions may also be linked within a same slot 605, where the linking may also be defined by a position of the monitoring occasions within the slot 605 and the slot 605 in which each monitoring occasion occurs. For example, a monitoring occasion of a second search space set 615 in slot 605-a may be linked with a third monitoring occasion 610-c of a first search space set 610-c that is also in slot 605-a. The linking may be represented by a different delta configuration than in the first example. For instance, in the following example, the configured association may be represented by (number of slots, number of symbols within the slots)=(0, 7). Here, the first term of the second delta configuration may be determined by the slots in which the linked monitoring occasions occur. In the case of the monitoring occasion of the second search space set 615 and the third monitoring occasion of the first search space set 610-c in slot 605-a, the monitoring occasion of the second search space set 615 and the third monitoring occasion of the first search space set 610-c occur within a same slot 605, the first term of the delta configuration is 0. The second term of the delta configuration may be determined by the difference in slots between the first symbol of the reference monitoring occasion and the first symbol of the linked monitoring occasion. In this case, the monitoring occasion of the second search space set 615 in slot 605-a begins in the 5th symbol of the slot 605-a and the third monitoring occasion of the first search space set 610-c begins in the 12th symbol of slot 605. Therefore the second term of the second delta configuration is 7. The same or different delta configuration may apply to the linking relationship that occurs in slot 605-c. Delta configurations may be defined for a number of slot and symbol configurations and may not be limited to the examples presented in FIG. 6.

Figure 7:
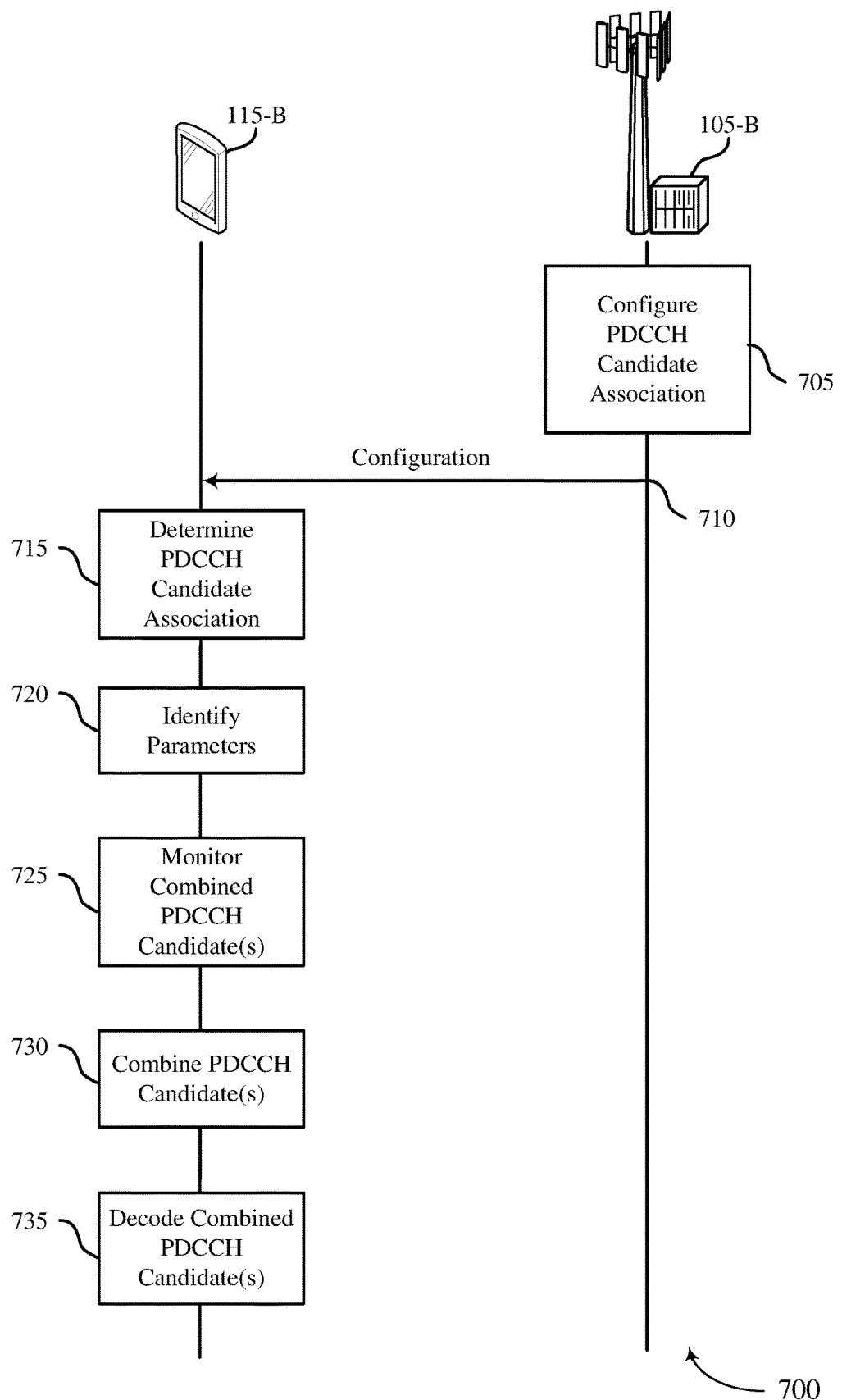
FIG. 7 illustrates an example of a process flow in a system that supports linking search space sets for PDCCH repetitions in accordance with aspects of the present disclosure.

FIG. 7 illustrates an example of a process flow 700 in a system that supports linking search space sets for PDCCH repetitions in accordance with aspects of the present disclosure. In some examples, the process flow 700 may implement aspects of wireless communications systems 100 and 200. Process flow 700 includes UE 115-b and base station 105-b. In the following description of the process flow 700, the operations performed by base station 105-b and UE 115-b may be performed in different orders or at different times. Some operations may also be left out of the process flow 700, or other operations may be added to the process flow 700. While base station 105-b and UE 115-b are shown performing a number of the operations of process flow 700, any wireless device may perform the operations shown or described. Process flow 700 may illustrate the linking of two search space sets for PDCCH repetition.

At 705, base station 105-b may configure an association between a first PDCCH candidate from a first search space set and a second PDCCH candidate from a second search space set. In some cases, the first search space set corresponds to a first coreset and the second search space set corresponds to a second search space set. In some cases, the first coreset and the second coreset are not the same. In some cases, the first search space set and the second search space set correspond to a same scheduled cell.

At 710, base station 105-b may transmit to UE 115-b, a configuration that indicates a PDCCH candidate association or a search space set association. In some cases, the association may be transmitted via RRC signaling. In some cases, the base station 105-b may further transmit an indication of a set of parameters to the UE 115-b. In some cases, the first search space set and the second search space set may each have an associated configuration indicating time and location of monitoring occasions within each of the first and second search space set. In some cases, the base station 105-b may transmit the configurations to the UE 115-b.

At 715, the UE 115-b may determine the association between the PDCCH candidates based on the received configuration or a fixed rule.

At 715, the UE 115-b may identify a set of parameters that indicate the association between a first PDCCH candidate and a second PDCCH candidate. Each set of associated PDCCH candidates may have a respective set of parameters and similarly each set of the search space sets may additionally have the respective set of parameters. In some cases, the parameters may include an indication that the first search space set is associated with a first control resource set, an indication of the second search space set is associated with a second control resource set, an index of the first PDCCH candidate, an index of the second PDCCH candidate, an aggregation level of the first PDCCH candidate, or an aggregation level of the second PDCCH candidate. In some cases, the UE 115-b may identify the parameters based on a second configuration including an index of the first PDCCH candidate, an index of the second PDCCH candidate, an aggregation level of the first PDCCH candidate, or an aggregation level of the second PDCCH candidate, or any combination thereof.

At 720, the UE 115-b may monitor for the first search space set and the second search space set based on identifying the set of parameters. In some cases, the UE 115-b monitors for the first search space set and the second search space set based on the configurations transmitted from the base station 105-b.

At 725, the UE 115-b may combine the first PDCCH candidate with the second PDCCH candidate based on the indication of the association and the determining. The combining of the first PDCCH candidate and the second PDCCH candidate may cause the UE 115-b to treat the combined candidate similarly to individual candidates in the first search space set or second search space set.

At 730, the UE 115-b may decode the combined PDCCH candidates. The UE 115-b may further decode individual PDCCH candidates of the first search space set or of the second search space set or may decode the combined PDCCH candidates.

Figure 8:
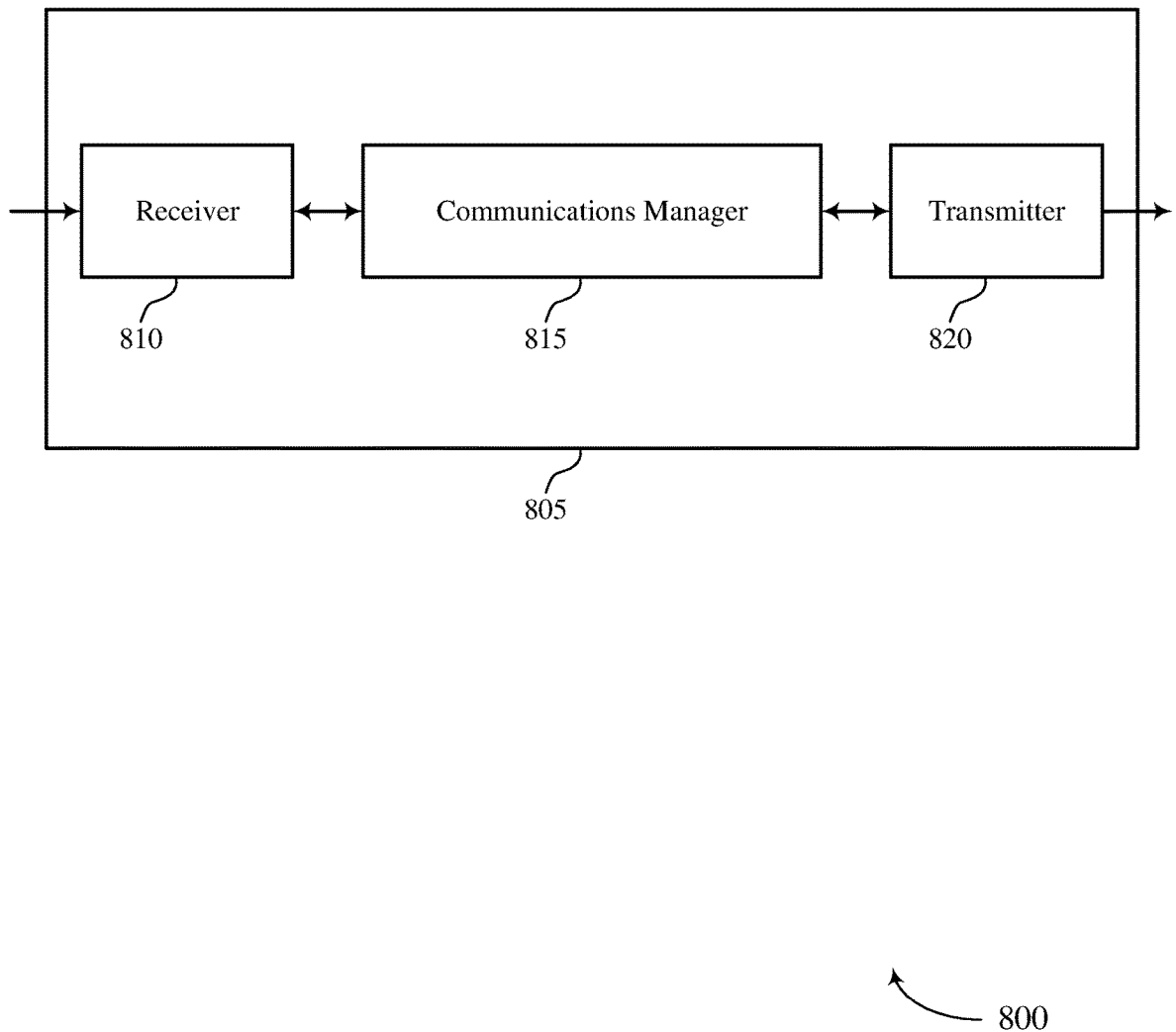
FIGS. 8 and 9 show block diagrams of devices that support linking search space sets for PDCCH repetitions in accordance with aspects of the present disclosure.

FIG. 8 shows a block diagram 800 of a device 805 that supports linking search space sets for PDCCH repetitions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to linking search space sets for PDCCH repetitions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a configuration that indicates an association between a first search space set and a second search space set. In some examples, the communications manager 815 may determining an association between a first physical downlink control channel candidate in the first search space set and a second physical downlink control channel candidate in the second search space set. In some examples, the communications manager 815 may combine, according to the configuration and based on the determining, the first PDCCH candidate and the second physical downlink control channel candidate based on monitoring for the first search space set and the second search space set. In some examples, the communications manager 815 may decode the combined first PDCCH candidate and the second physical downlink control channel candidate. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. One implementation may allow a UE 115 to reliably communicate with a base station 105 via a combined PDCCH. For example, a UE 115 may combine PDCCH candidates linked by a base station 105 and use the combined PDCCH candidate to receive DCI, which may lead to enhanced reliability in the system. Additionally, linking or association information provided by the base station 105 may enable the UE 115 to monitor a greater number of PDCCH candidates, including linked candidates, thereby enhancing the overall diversity in the system. By combining linked PDCCH candidates, the UE 115 may save time and power resources by receiving control information via combined PDCCH.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
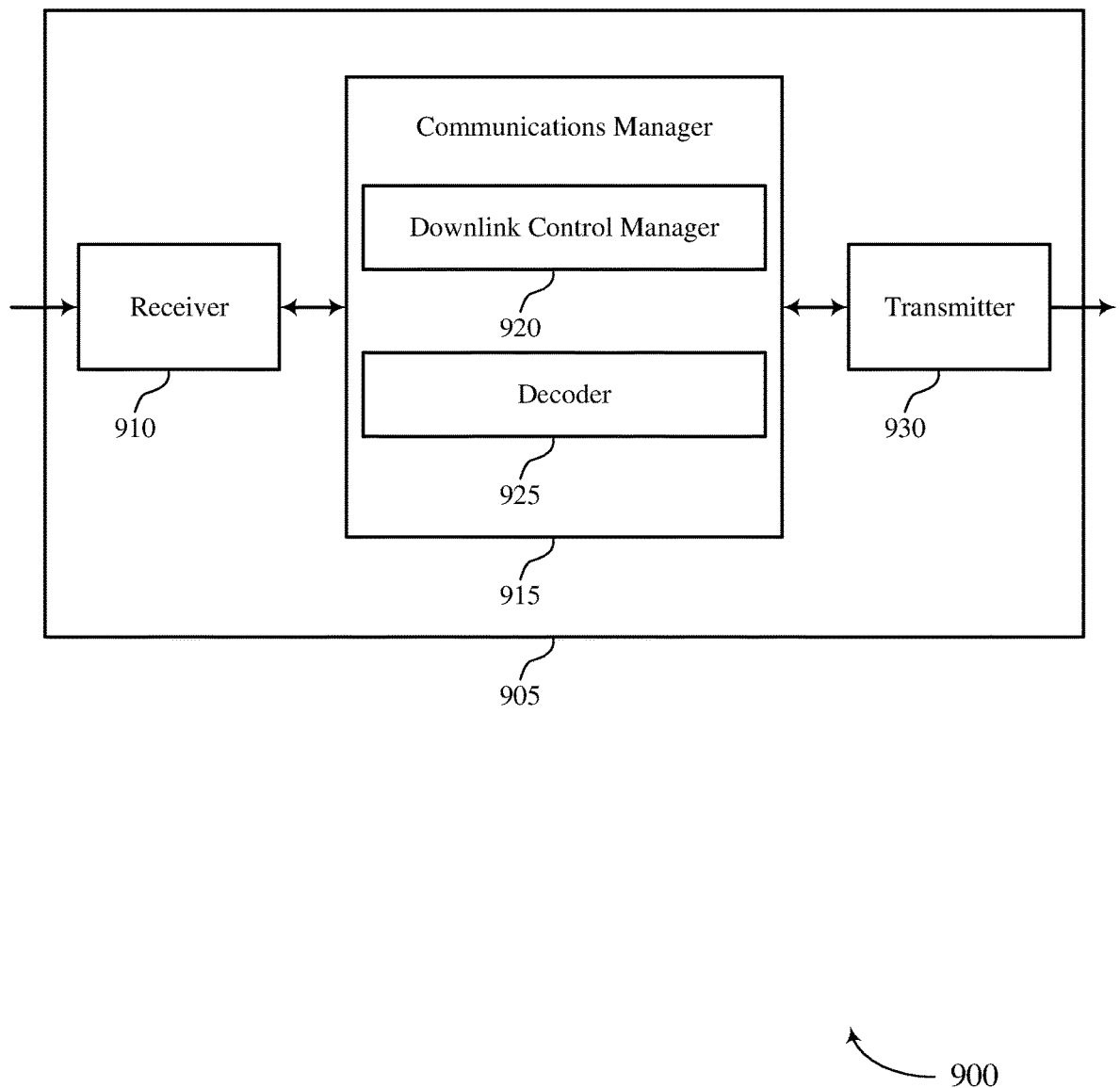

FIG. 9 shows a block diagram 900 of a device 905 that supports linking search space sets for PDCCH repetitions in accordance with aspects of the present disclosure. The device 905 may be an example of aspects of a device 805, or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to linking search space sets for PDCCH repetitions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a downlink control manager 920 and a decoder 925. The communications manager 915 may be an example of aspects of the communications manager 1110 described herein.

The downlink control manager 920 may receive, from a base station, a configuration that indicates an association between a first search space set and a second search space set. In some cases, the downlink control manager 920 may determining an association between a first physical downlink control channel candidate in the first search space set and a second physical downlink control channel candidate in the second search space set. In some cases, the downlink control manager 920 may combine, according to the configuration and based on the determining, the first PDCCH candidate and the second physical downlink control channel candidate based on monitoring for the first search space set and the second search space set.

The decoder 925 may decode the combined first PDCCH candidate and the second physical downlink control channel candidate.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Based on signaling received from a base station 105, a processor of a UE 115 (e.g., controlling the receiver 910, the transmitter 930, or the transceiver 1120 described with reference to FIG. 11) may efficiently identify a configuration that indicates an association between different search space sets. Further, the processor of UE 115 may decode the combined PDCCH candidates. The processor of the UE 115 may thus turn on one or more processing units upon receiving the configuration, and then combine the two PDCCH candidates for decoding. As such, when the association information is received, the processor may be ready to receive control information more reliably through the diversified PDCCH candidate pool, which may further reduce processing times when searching for, and decoding, downlink control information.

Figure 10:
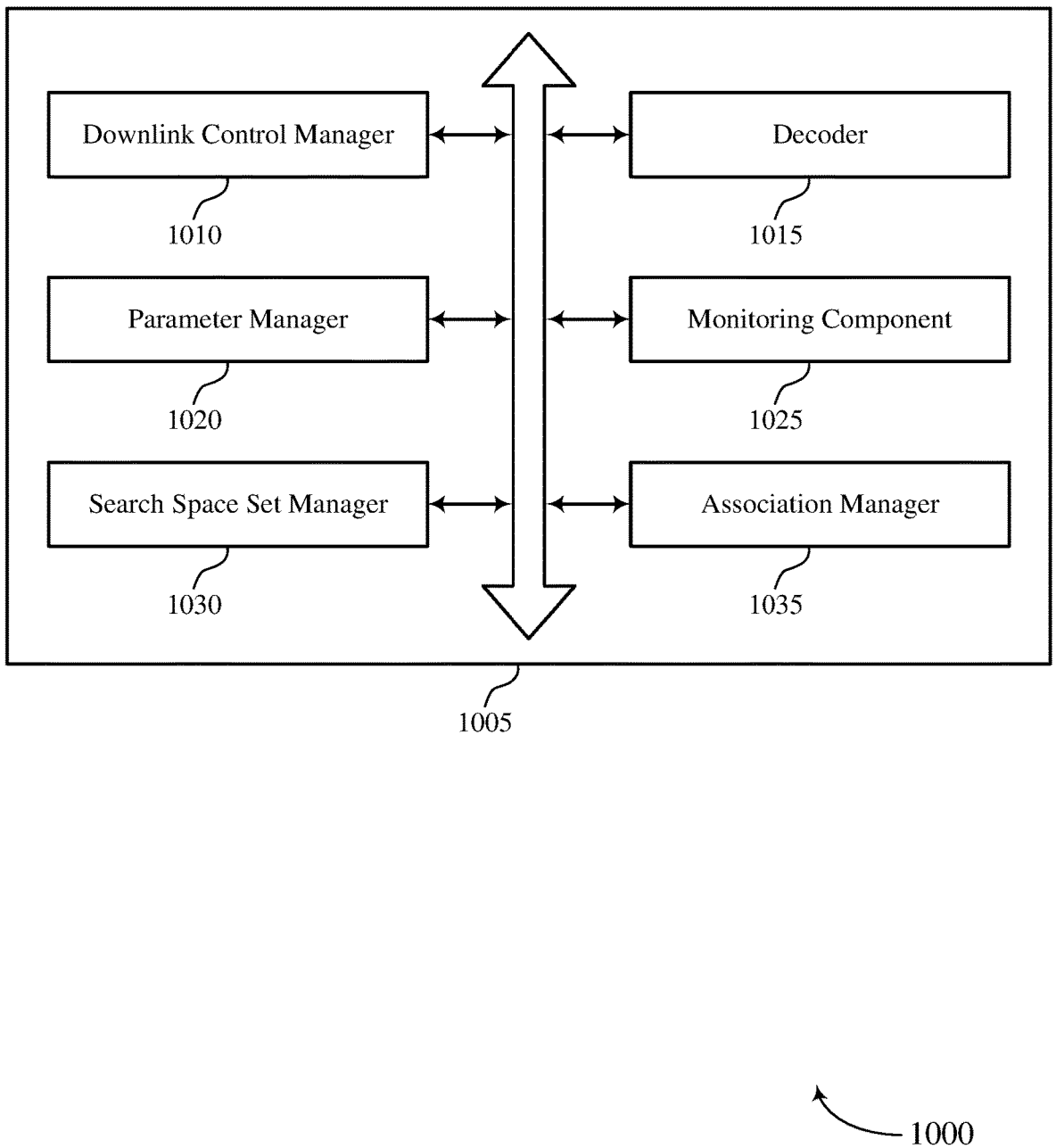
FIG. 10 shows a block diagram of a communications manager that supports linking search space sets for PDCCH repetitions in accordance with aspects of the present disclosure.

FIG. 10 shows a block diagram 1000 of a communications manager 1005 that supports linking search space sets for PDCCH repetitions in accordance with aspects of the present disclosure. The communications manager 1005 may be an example of aspects of a communications manager 815, a communications manager 915, or a communications manager 1110 described herein. The communications manager 1005 may include a downlink control manager 1010, a decoder 1015, a parameter manager 1020, a monitoring component 1025, a search space set manager 1030, and an association manager 1035. Each of these modules may communicate, directly or indirectly, with one another (e.g., via one or more buses).

The downlink control manager 1010 may receive, from a base station, a configuration that indicates an association between a first search space set and a second search space set.

In some examples, the downlink control manager 1010 may determine an association between a first physical downlink control channel candidate in the first search space set and a second physical downlink control channel candidate in the second search space set.

In some examples, the downlink control manager 1010 may combine, according to the configuration and based on the determining, the first PDCCH candidate and the second physical downlink control channel candidate based on monitoring for the first search space set and the second search space set.

In some examples, the downlink control manager 1010 may determine that a transmission configuration indicator field associated with downlink control information for the combined first PDCCH candidate and the second physical downlink control channel candidate is present, the determination being based on the configured presence or absence of the first transmission configuration indicator field being different from the second transmission configuration indicator field.

In some examples, the downlink control manager 1010 may combine the first PDCCH candidate and the second physical downlink control channel candidate is based on a capability of the UE.

In some cases, a first control resource set associated with the first search space set and a second control resource set associated with the second search space set are configured in a same serving cell. In some cases, a first control resource set associated with the first search space set is different than a second control resource set associated with the second search space set.

In some cases, a configured presence or absence of a first transmission configuration indicator field associated with downlink control information for the first control resource set is the same as a configured presence or absence of a second transmission configuration indicator field associated with downlink control information for the second control resource set.

In some cases, a transmission configuration indicator state for the first control resource set is different for the second control resource set. In some cases, a first control resource set associated with the first search space set has a different pool index configuration as a second control resource set associated with the second search space set. In some other cases, a first control resource set associated with the first search space set has a same pool index configuration as a second control resource set associated with the second search space set. In some cases, the first search space set is different than the second search space set.

In some cases, the first search space set and the second search space set have a same search space type. In some cases, the first search space set and the second search space set are configured for monitoring a same format of downlink control information. In some cases, the first PDCCH candidate has a same aggregation level as the second PDCCH candidate.

In some cases, the first PDCCH candidate has a first aggregation level that is different than a second aggregation level for the second PDCCH candidate, where the first aggregation level and the second aggregation level are from a same set of aggregation levels. In some cases, a threshold number of combined PDCCH candidates within a time interval are based on the capability of the UE.

The decoder 1015 may decode the combined first PDCCH candidate and the second physical downlink control channel candidate.

The parameter manager 1020 may identify, from the received configuration or a second configuration, a set of parameters that indicate the association between the first PDCCH candidate and the second physical downlink control channel candidate.

In some examples, the parameter manager 1020 may identify respective sets of parameters for each combined PDCCH candidate of one or more combined PDCCH candidates. In some examples, the parameter manager 1020 may identify respective sets of parameters for each search space set pair of one or more search space set pairs.

In some examples, the parameter manager 1020 may identify one or more parameters for monitoring for the first search space set and the second search space set, the one or more parameters including a combined monitoring occasion periodicity, a combined monitoring occasion offset, or any combination thereof, where combining the first PDCCH candidate and the second physical downlink control channel candidate is based on the one or more parameters.

In some cases, the set of parameters includes an indication of the first search space set associated with a first control resource set, an indication of the second search space set associated with a second control resource set, an index of the first PDCCH candidate, an index of the second PDCCH candidate, an aggregation level of the first PDCCH candidate, or an aggregation level of the second PDCCH candidate, or any combination thereof.

The monitoring component 1025 may monitor for the first search space set and the second search space set based on identifying the set of parameters. In some examples, the monitoring component 1025 may monitor for the combined first PDCCH candidate and the second physical downlink control channel candidate based on the first search space set and the second search space set and in accordance with the first configuration and the second configuration.

In some examples, the monitoring component 1025 may monitor for the combined first PDCCH candidate and the second physical downlink control channel candidate based on identifying that the first search space set and the second search space set are included within a same time interval. In some examples, the monitoring component 1025 may identify the time interval including the first search space set and the second search space set, where combining the first PDCCH candidate and the second physical downlink control channel candidate is based on the time interval.

In some examples, the monitoring component 1025 may identify a first number of monitoring occasions for the first search space set within the same time interval based on the first configuration. In some examples, the monitoring component 1025 may identify a second number of monitoring occasions for the second search space set within the same time interval based on the second configuration.

In some examples, the monitoring component 1025 may monitor for the combined first PDCCH candidate and the second physical downlink control channel candidate during the two or more respective time intervals based on identifying that the first search space set and the second search space set are included in two or more respective time intervals.

In some examples, the monitoring component 1025 may identify an instance of the first monitoring occasion for the first search space set within a time interval of the two or more respective time intervals. In some examples, the monitoring component 1025 may identify an offset from the instance of the first monitoring occasion. In some examples, the monitoring component 1025 may identify the second monitoring occasion for the second search space set based on the offset.

The search space set manager 1030 may identify a first configuration for the first search space set, the first configuration indicating one or more monitoring occasions for the first search space set. In some examples, the search space set manager 1030 may identify a second configuration for the second search space set, the second configuration indicating one or more monitoring occasions for the second search space set.

In some examples, the search space set manager 1030 may identify that the first search space set and the second search space set are included within a same time interval. In some examples, the search space set manager 1030 may identify that each of the first search space set and the second search space set have a single monitoring occasion within the time interval based on the first configuration and the second configuration.

In some examples, the search space set manager 1030 may identify that at least one of the first search space set or the second search space set have a set of monitoring occasions within the same time interval based on the first configuration and the second configuration. In some examples, the search space set manager 1030 may identify that the first search space set and the second search space set are included in two or more respective time intervals.

The association manager 1035 may identify an association between a monitoring occasion of the first search space set and a monitoring occasion of the second search space set during the time interval, where monitoring for the combined first PDCCH candidate and the second physical downlink control channel candidate is based on the association between the monitoring occasion of the first search space set and the monitoring occasion of the second search space set.

In some examples, the association manager 1035 may identify respective associations between each monitoring occasion of the first search space set and each monitoring occasion of the second search space set within the same time interval, where monitoring for the combined first PDCCH candidate and the second physical downlink control channel candidate is based on the respective associations.

In some examples, the association manager 1035 may identify an association between one or more monitoring occasions of the first search space set and one or more monitoring occasions of the second search space set based on the second number of monitoring occasions for the second search space set being less than the first number of monitoring occasions for the first search space set, where monitoring for the combined first PDCCH candidate and the second physical downlink control channel candidate is based on the association between the one or more monitoring occasions of the first search space set and the one or more monitoring occasions of the second search space set.

In some examples, the association manager 1035 may identify a linking configuration that indicates an association between one or more instances of the first search space set and one or more instances of the second search space set within the same time interval, where monitoring for the combined first PDCCH candidate and the second physical downlink control channel candidate is based on the linking configuration.

In some examples, the association manager 1035 may identify, based on the configuration, an association between a first monitoring occasion for the first search space set and a second monitoring occasion for the second search space set during the two or more respective time intervals, where monitoring for the combined first PDCCH candidate and the second physical downlink control channel candidate is based on the association between the first monitoring occasion for the first search space set and the second monitoring occasion for the second search space set.

In some cases, the association is based on one or more monitoring occasions for the first search space set occurring before one or more monitoring occasions for the second search space set, the one or more monitoring occasions for the first search space set occurring after the one or more monitoring occasions for the second search space set, or any combination thereof.

Figure 11:
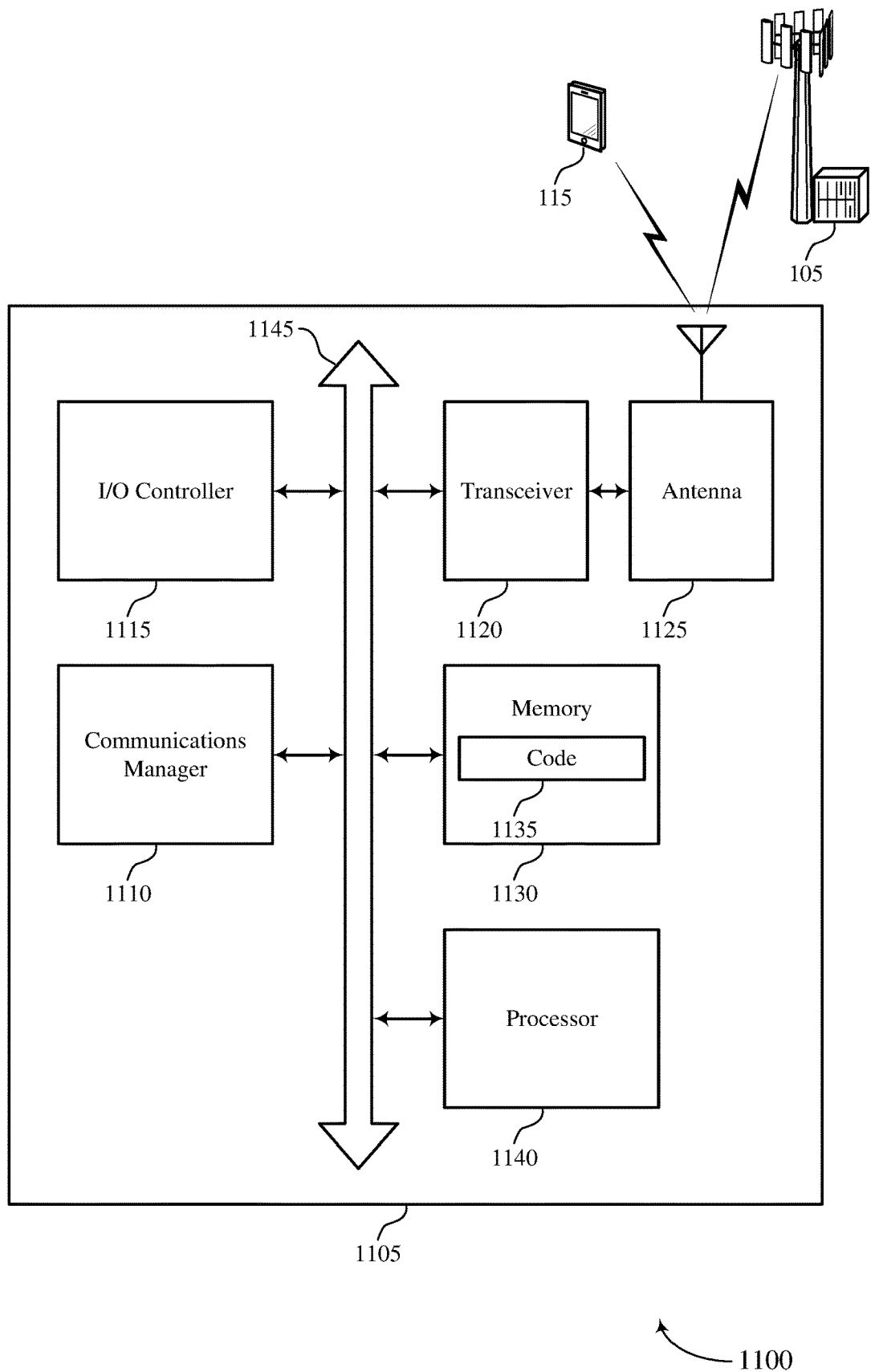
FIG. 11 shows a diagram of a system including a device that supports linking search space sets for PDCCH repetitions in accordance with aspects of the present disclosure.

FIG. 11 shows a diagram of a system 1100 including a device 1105 that supports linking search space sets for PDCCH repetitions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a configuration that indicates an association between a first search space set and a second search space set. In some cases, the communications manager 1110 may determine an association between a first physical downlink control channel candidate in the first search space set and a second physical downlink control channel candidate in the second search space set. In some cases, the communications manager 1110 may combine, according to the configuration and based on the determining, the first PDCCH candidate and the second physical downlink control channel candidate based on monitoring for the first search space set and the second search space set. In some examples, the communications manager 1110 may decode the combined first PDCCH candidate and the second physical downlink control channel candidate.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a digital signal processor (DSP), a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting linking search space sets for PDCCH repetitions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
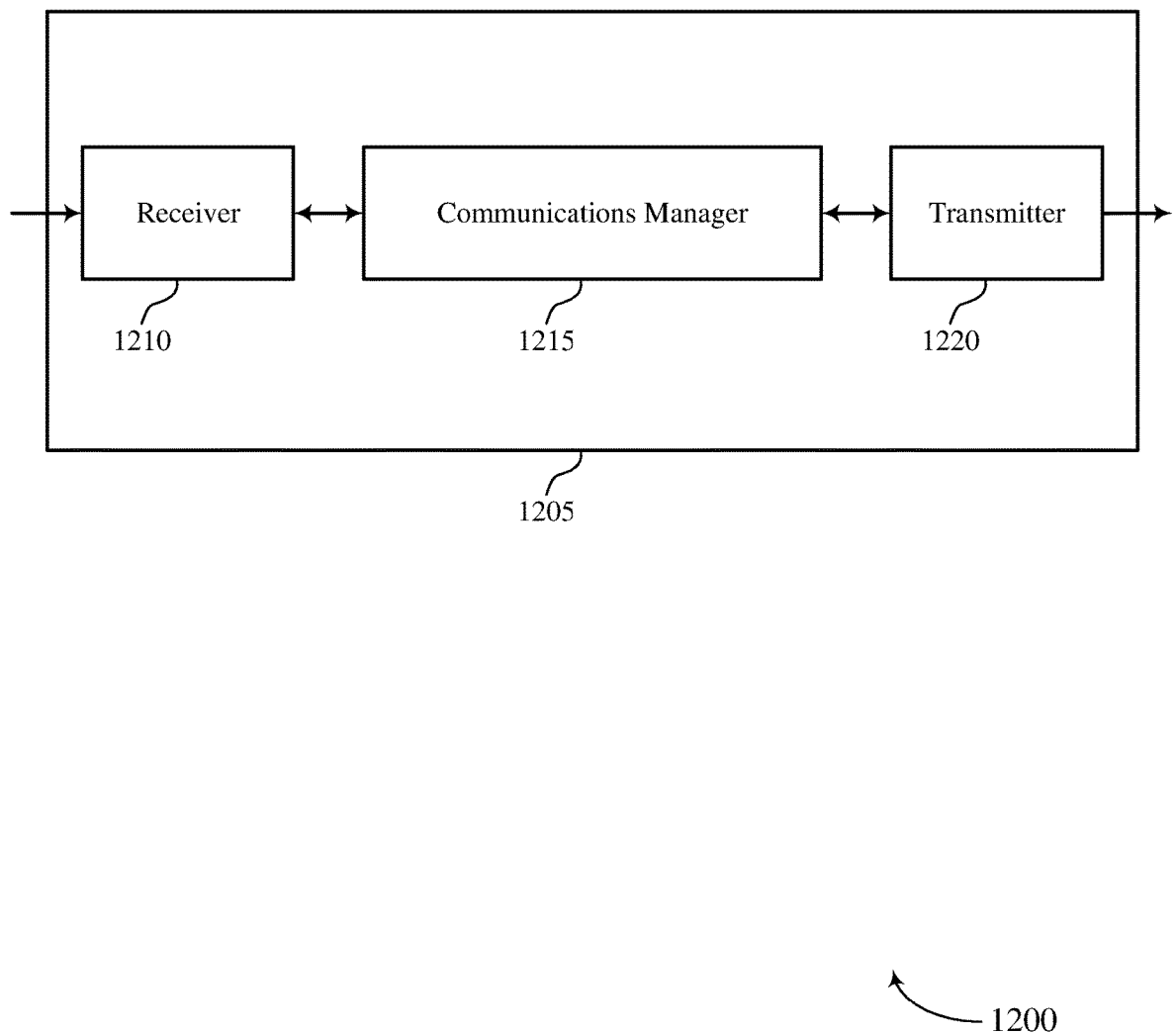
FIGS. 12 and 13 show block diagrams of devices that support linking search space sets for PDCCH repetitions in accordance with aspects of the present disclosure.

FIG. 12 shows a block diagram 1200 of a device 1205 that supports linking search space sets for PDCCH repetitions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to linking search space sets for PDCCH repetitions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may configure an association between a first PDCCH candidate corresponding to a first search space set and a second physical downlink control channel candidate corresponding to a second search space set. In some examples, the communications manager 1215 may transmit, to a UE 115, an indication of the association between the first PDCCH candidate and the second physical downlink control channel candidate. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
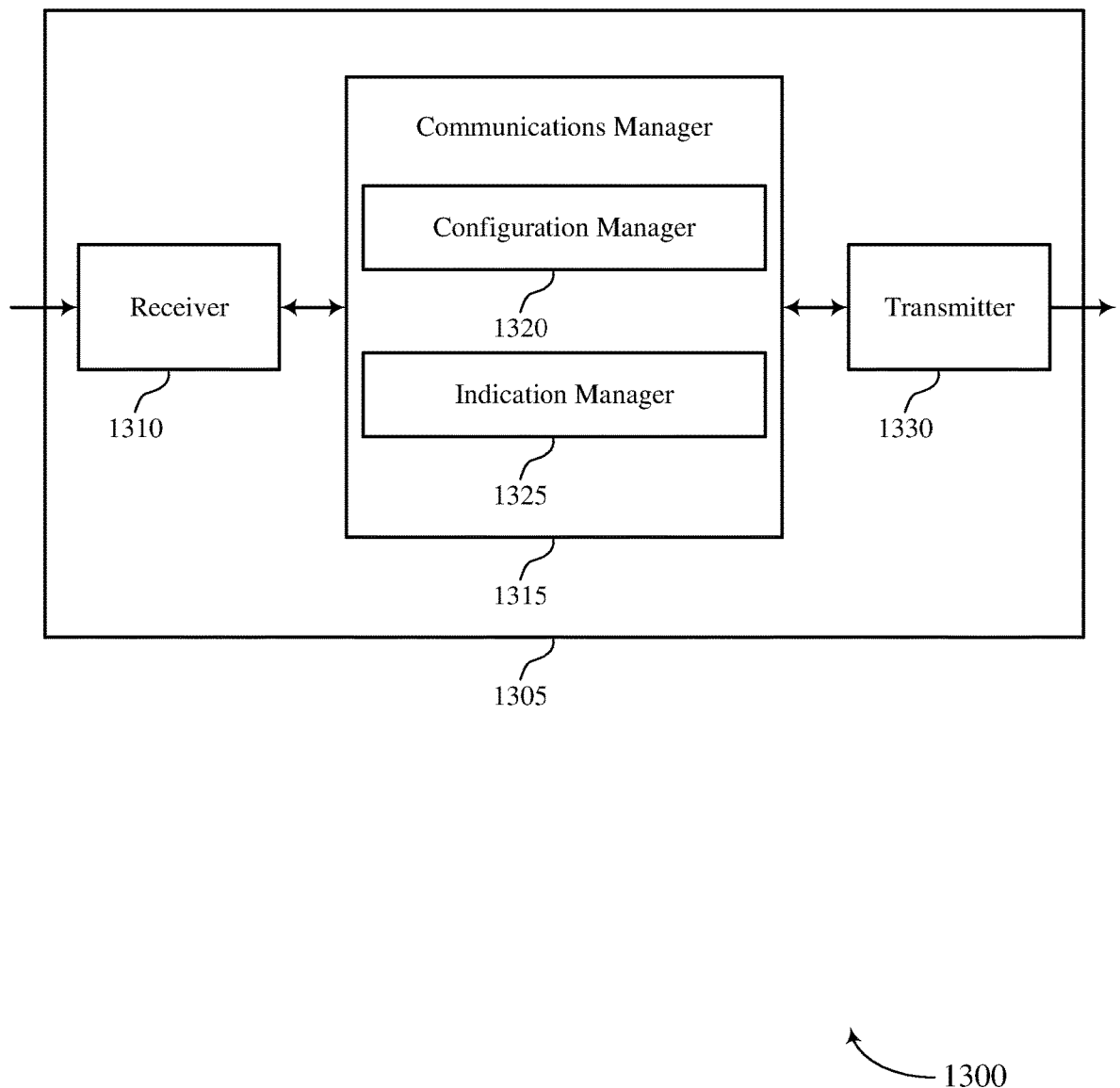

FIG. 13 shows a block diagram 1300 of a device 1305 that supports linking search space sets for PDCCH repetitions in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to linking search space sets for PDCCH repetitions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320 and an indication manager 1325. The communications manager 1315 may be an example of aspects of the communications manager 1510 described herein.

The configuration manager 1320 may configure an association between a first PDCCH candidate corresponding to a first search space set and a second physical downlink control channel candidate corresponding to a second search space set.

The indication manager 1325 may transmit, to a user equipment, an indication of the association between the first PDCCH candidate and the second physical downlink control channel candidate.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
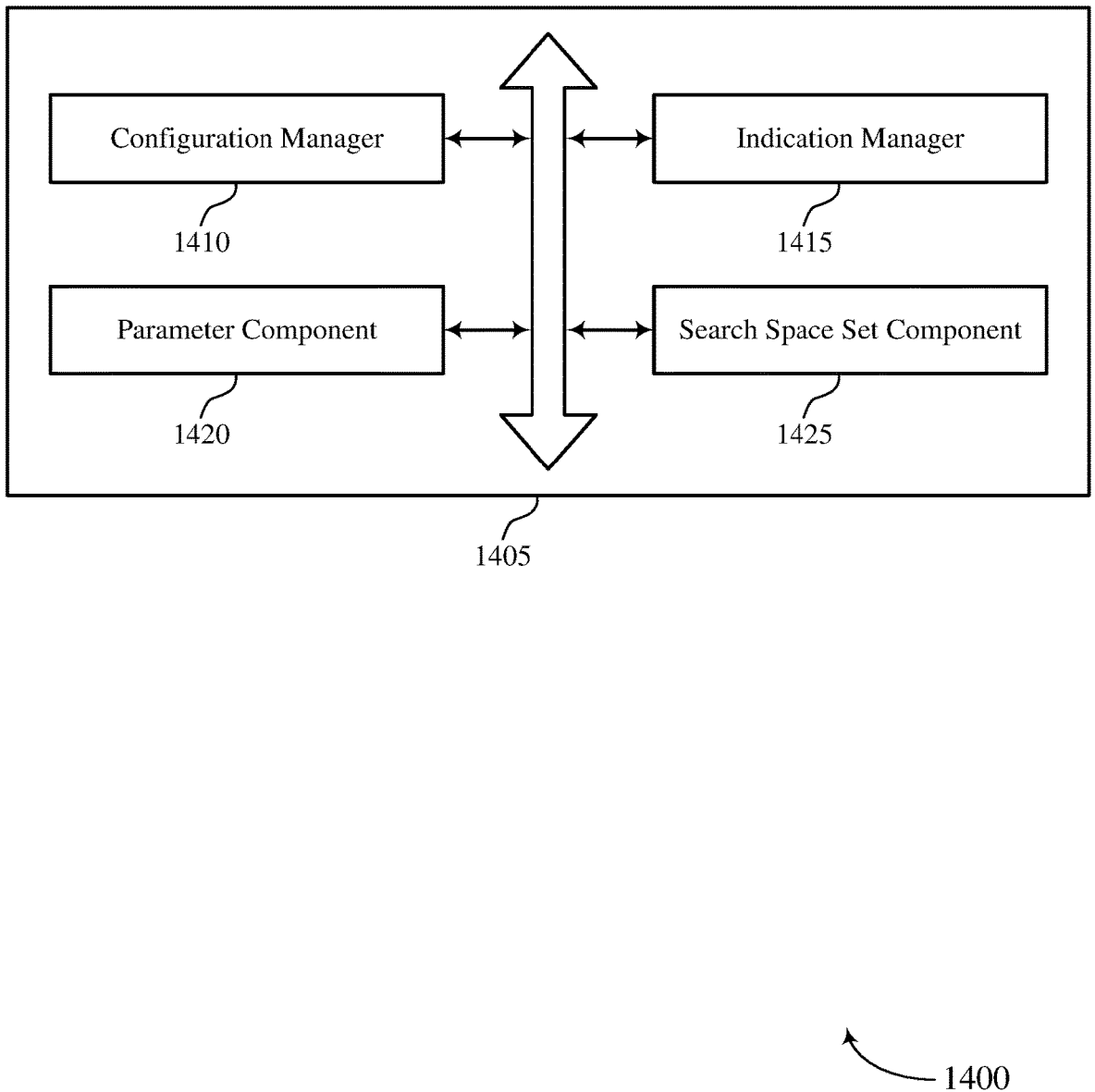
FIG. 14 shows a block diagram of a communications manager that supports linking search space sets for PDCCH repetitions in accordance with aspects of the present disclosure.

FIG. 14 shows a block diagram 1400 of a communications manager 1405 that supports linking search space sets for PDCCH repetitions in accordance with aspects of the present disclosure. The communications manager 1405 may be an example of aspects of a communications manager 1215, a communications manager 1315, or a communications manager 1510 described herein. The communications manager 1405 may include a configuration manager 1410, an indication manager 1415, a parameter component 1420, and a search space set component 1425. Each of these modules may communicate, directly or indirectly, with one another (e.g., via one or more buses).

The configuration manager 1410 may configure an association between a first PDCCH candidate corresponding to a first search space set and a second physical downlink control channel candidate corresponding to a second search space set.

In some examples, the configuration manager 1410 may identify a first configuration for the first search space set, the first configuration indicating one or more monitoring occasions for the first search space set. In some examples, the configuration manager 1410 may identify a second configuration for the second search space set, the second configuration indicating one or more monitoring occasions for the second search space set.

In some examples, the configuration manager 1410 may configure a linking configuration that indicates an association between one or more instances of the first search space set and one or more instances of the second search space set within the same time interval. In some examples, the configuration manager 1410 may configure an association between a first monitoring occasion for the first search space set and a second monitoring occasion for the second search space set during the two or more respective time intervals.

In some examples, configuring one or more parameters for monitoring for the first search space set and the second search space set, the one or more parameters including a combined monitoring occasion periodicity, a combined monitoring occasion offset, or any combination thereof, where the indication of the association includes the configured one or more parameters.

In some examples, the configuration manager 1410 may configure an instance of the first monitoring occasion for the first search space set within a time interval of the two or more respective time intervals. In some examples, the configuration manager 1410 may identify an offset from the instance of the first monitoring occasion. In some examples, the configuration manager 1410 may configure the second monitoring occasion for the second search space set based on the offset.

In some examples, the configuration manager 1410 may combine the first PDCCH candidate and the second physical downlink control channel candidate is based on a capability of the UE. In some cases, a first control resource set associated with the first search space set and a second control resource set associated with the second search space set are configured in a same serving cell. In some cases, a first control resource set associated with the first search space set is different than a second control resource set associated with the second search space set.

In some cases, a configured presence or absence of a first transmission configuration indicator field associated with downlink control information for the first control resource set is the same as a configured presence or absence of a second transmission configuration indicator field associated with downlink control information for the second control resource set.

In some cases, a configured presence or absence of a first transmission configuration indicator field associated with downlink control information for the first control resource set is different from a configured presence or absence of a second transmission configuration indicator field associated with downlink control information for the second control resource set. In some cases, a first control resource set associated with the first search space set has a different pool index configuration as a second control resource set associated with the second search space set. In some other cases, a first control resource set associated with the first search space set has a same pool index configuration as a second control resource set associated with the second search space set. In some cases, the first search space set is different than the second search space set. In some cases, the first search space set and the second search space set have a same search space type.

In some cases, the first search space set and the second search space set are configured for monitoring a same format of downlink control information.

In some cases, the first PDCCH candidate has a same aggregation level as the second PDCCH candidate. In some cases, the first PDCCH candidate has a first aggregation level that is different than a second aggregation level for the second PDCCH candidate, where the first aggregation level and the second aggregation level are from a same set of aggregation levels. In some cases, a maximum number of combined PDCCH candidate within a time interval are based on the capability of the UE.

The indication manager 1415 may transmit, to a user equipment, an indication of the association between the first PDCCH candidate and the second physical downlink control channel candidate. In some examples, the indication manager 1415 may transmit an indication of the set of parameters to the UE. In some examples, the indication manager 1415 may transmit an indication of the first configuration and the second configuration to the UE. In some examples, the indication manager 1415 may transmit an indication of the linking configuration to the UE.

The parameter component 1420 may identify a set of parameters that indicate the association between the first PDCCH candidate and the second physical downlink control channel candidate. In some examples, the parameter component 1420 may identify respective sets of parameters for each combined PDCCH candidate of one or more combined PDCCH candidates. In some examples, the parameter component 1420 may identify respective sets of parameters for each search space set pair of one or more search space set pairs.

In some cases, the set of parameters includes an indication of the first search space set associated with a first control resource set, an indication of the second search space set associated with a second control resource set, an index of the first PDCCH candidate, an index of the second PDCCH candidate, an aggregation level of the first PDCCH candidate, or an aggregation level of the second PDCCH candidate, or any combination thereof.

The search space set component 1425 may transmit the first search space set and the second search space set during a same time interval based on the first configuration and the second configuration.

In some examples, the search space set component 1425 may identify a first number of monitoring occasions for the first search space set within the same time interval based on the first configuration.

In some examples, the search space set component 1425 may identify a second number of monitoring occasions for the second search space set within the same time interval based on the second configuration, where one or more monitoring occasions of the first search space set are associated with one or more monitoring occasions of the second search space set based on the second number of monitoring occasions for the second search space set being less than the first number of monitoring occasions for the first search space set.

In some examples, the search space set component 1425 may transmit the first search space set and the second search space set during a during the two or more respective time intervals based on the first configuration and the second configuration. In some cases, each of the first search space set and the second search space set have a single monitoring occasion within the same time interval based on the first configuration and the second configuration.

In some cases, at least one of the first search space set or the second search space set have a set of monitoring occasions within the same time interval based on the first configuration and the second configuration, and where a monitoring occasion of the first search space set is associated with a monitoring occasion of the second search space set during the same time interval.

In some cases, at least one of the first search space set or the second search space set have a set of monitoring occasions within the same time interval based on the first configuration and the second configuration, and where each monitoring occasion of the first search space set have a respective association with each monitoring occasion of the second search space set within the same time interval.

In some cases, the association is based on one or more monitoring occasions for the first search space set occurring before one or more monitoring occasions for the second search space set, the one or more monitoring occasions for the first search space set occurring after the one or more monitoring occasions for the second search space set, or any combination thereof.

Figure 15:
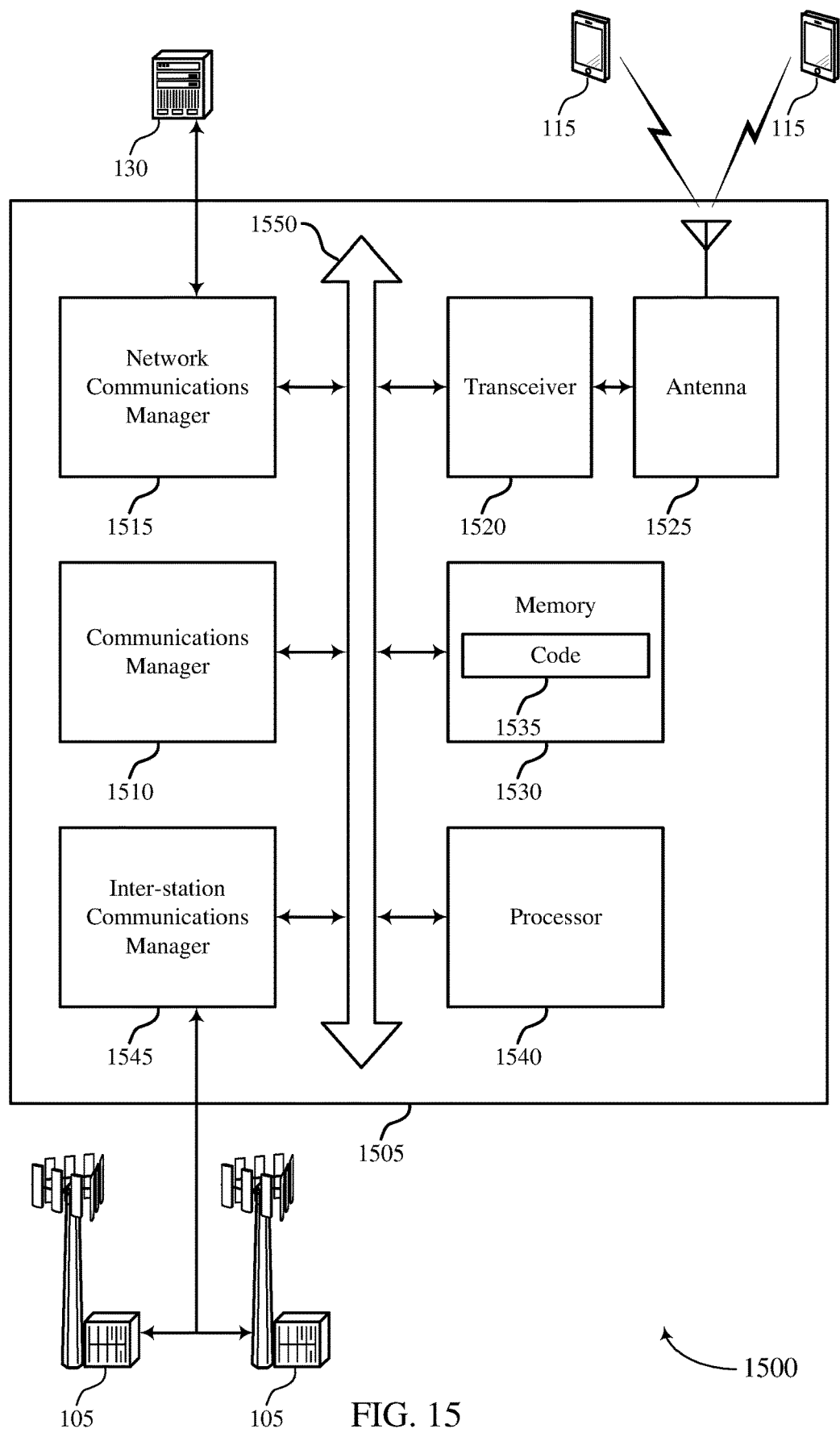
FIG. 15 shows a diagram of a system including a device that supports linking search space sets for PDCCH repetitions in accordance with aspects of the present disclosure.

FIG. 15 shows a diagram of a system 1500 including a device 1505 that supports linking search space sets for PDCCH repetitions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may configure an association between a first PDCCH candidate corresponding to a first search space set and a second physical downlink control channel candidate corresponding to a second search space set. In some cases, the communications manager 1510 may transmit an indication of the association between the first PDCCH candidate and the second physical downlink control channel candidate.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting linking search space sets for PDCCH repetitions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
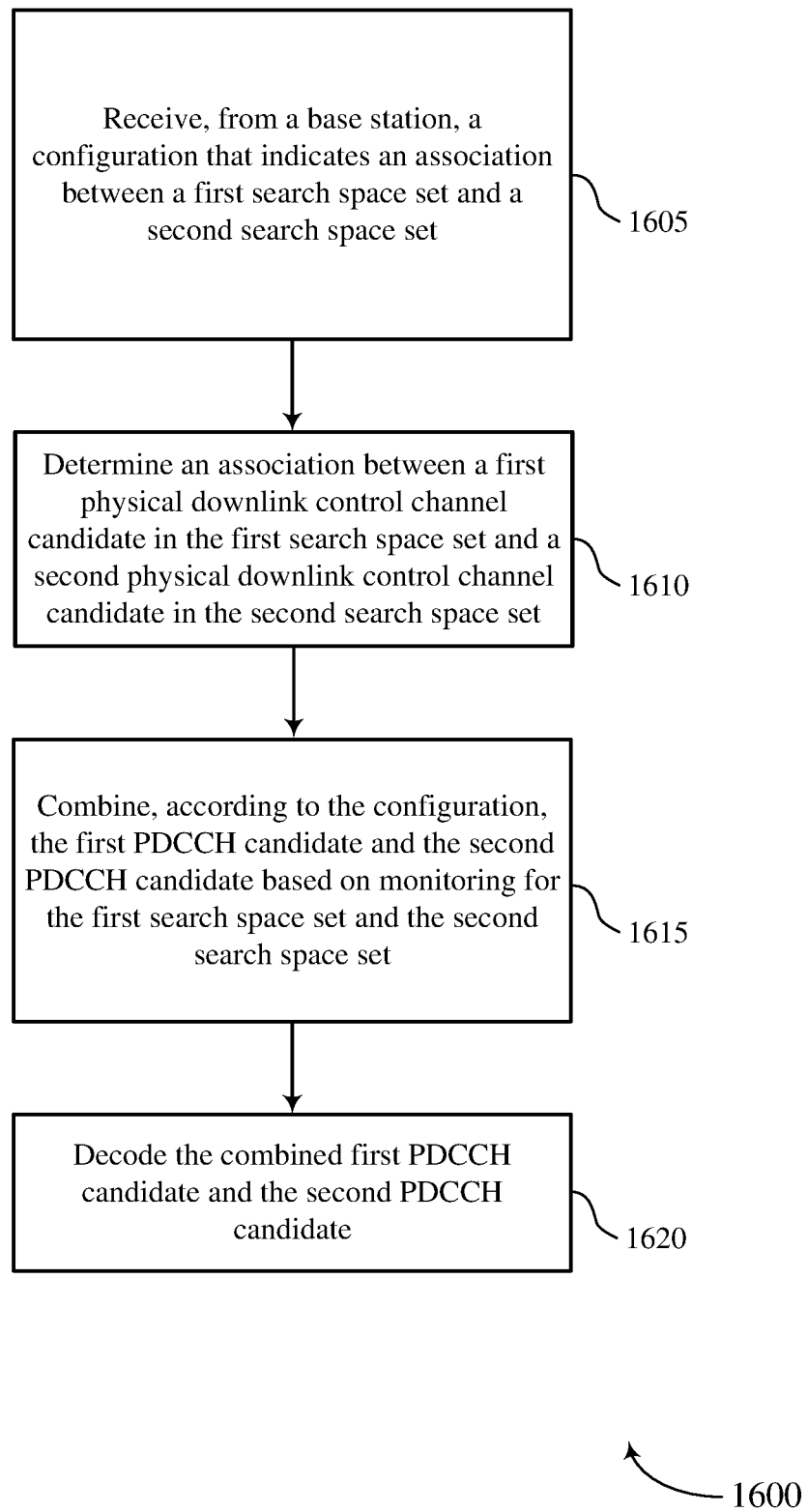
FIGS. 16 through 18 show flowcharts illustrating methods that support linking search space sets for PDCCH repetitions in accordance with aspects of the present disclosure.

FIG. 16 shows a flowchart illustrating a method 1600 that supports linking search space sets for PDCCH repetitions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a configuration that indicates an association between a first search space set and a second search space set. The operations of 1605 may be performed according to the methods described herein. In some examples, aspects of the operations of 1605 may be performed by a downlink control manager as described with reference to FIGS. 8 through 11.

At 1610, the UE may determine an association between a first physical downlink control channel candidate in the first search space set and a second physical downlink control channel candidate in the second search space set. The operations of 1610 may be performed according to the methods described herein. In some examples, aspects of the operations of 1610 may be performed by a downlink control manager as described with reference to FIGS. 8 through 11.

At 1615, the UE may combine, according to the configuration and based on the determining, the first PDCCH candidate and the second physical downlink control channel candidate based on monitoring for the first search space set and the second search space set. The operations of 1615 may be performed according to the methods described herein. In some examples, aspects of the operations of 1615 may be performed by a downlink control manager as described with reference to FIGS. 8 through 11.

At 1620, the UE may decode the combined first PDCCH candidate and the second physical downlink control channel candidate. The operations of 1620 may be performed according to the methods described herein. In some examples, aspects of the operations of 1620 may be performed by a decoder as described with reference to FIGS. 8 through 11.

Figure 17:
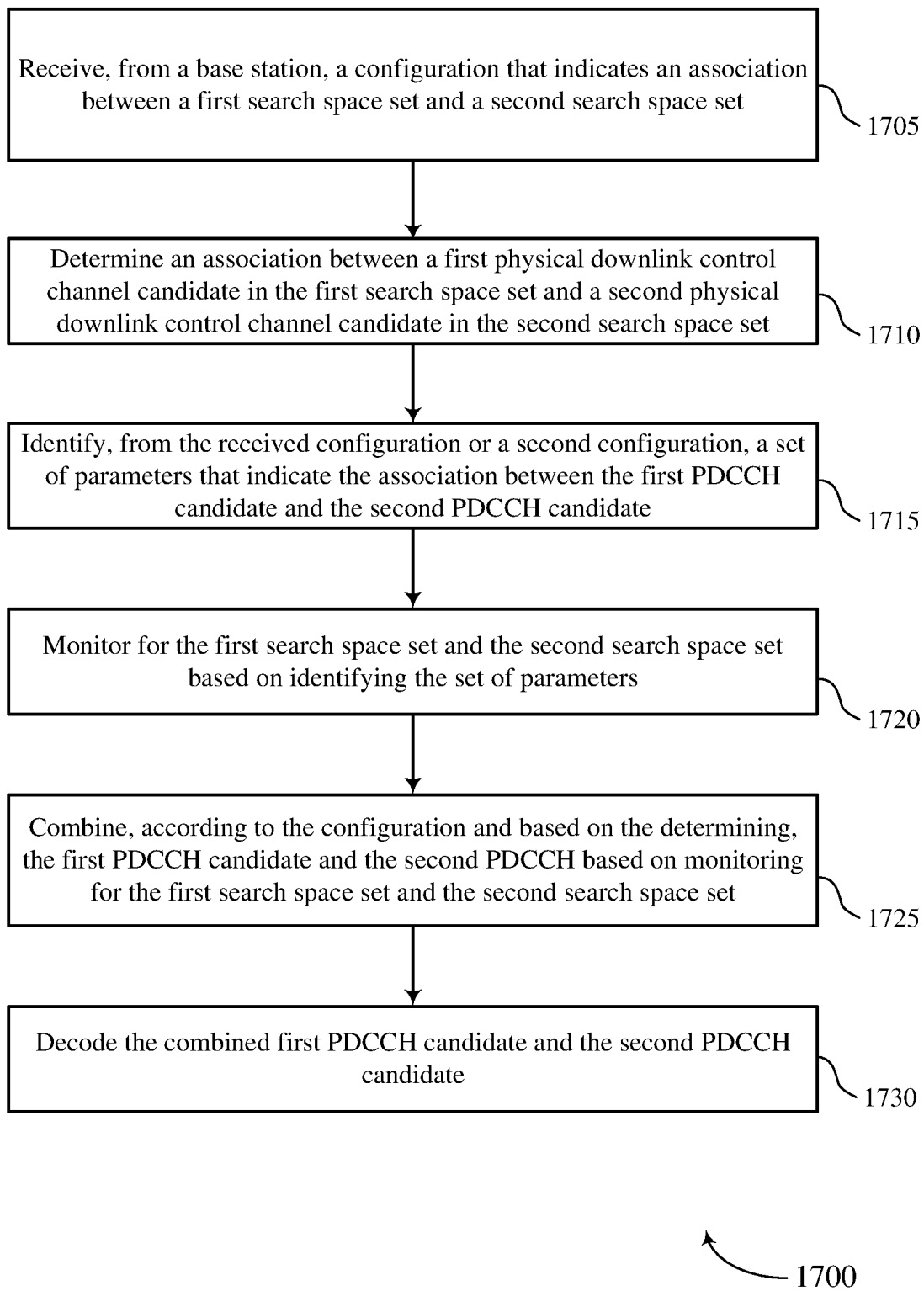

FIG. 17 shows a flowchart illustrating a method 1700 that supports linking search space sets for PDCCH repetitions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a configuration that indicates an association between a first search space set and a second search space set. The operations of 1705 may be performed according to the methods described herein. In some examples, aspects of the operations of 1705 may be performed by a downlink control manager as described with reference to FIGS. 8 through 11.

At 1710, the UE may determine an association between a first physical downlink control channel candidate in the first search space set and a second physical downlink control channel candidate in the second search space set. The operations of 1710 may be performed according to the methods described herein. In some examples, aspects of the operations of 1710 may be performed by a downlink control manager as described with reference to FIGS. 8 through 11.

At 1715, the UE may identify, from the received configuration or a second configuration, a set of parameters that indicate the association between the first PDCCH candidate and the second physical downlink control channel candidate. The operations of 1715 may be performed according to the methods described herein. In some examples, aspects of the operations of 1715 may be performed by a parameter manager as described with reference to FIGS. 8 through 11.

At 1720, the UE may monitor for the first search space set and the second search space set based on identifying the set of parameters. The operations of 1720 may be performed according to the methods described herein. In some examples, aspects of the operations of 1720 may be performed by a monitoring component as described with reference to FIGS. 8 through 11.

At 1725, the UE may combine, according to the configuration and based on the determining, the first PDCCH candidate and the second physical downlink control channel candidate based on monitoring for the first search space set and the second search space set. The operations of 1725 may be performed according to the methods described herein. In some examples, aspects of the operations of 1725 may be performed by a downlink control manager as described with reference to FIGS. 8 through 11.

At 1730, the UE may decode the combined first PDCCH candidate and the second physical downlink control channel candidate. The operations of 1730 may be performed according to the methods described herein. In some examples, aspects of the operations of 1730 may be performed by a decoder as described with reference to FIGS. 8 through 11.

Figure 18:
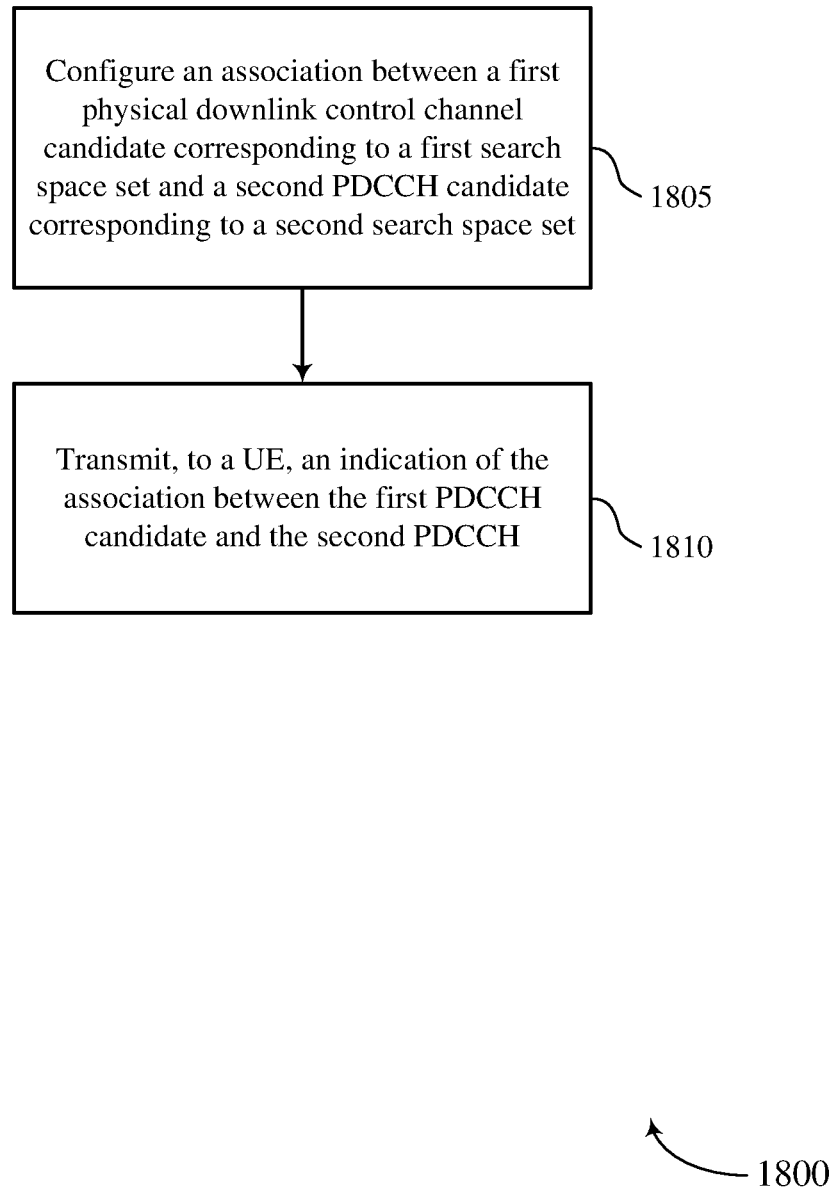

FIG. 18 shows a flowchart illustrating a method 1800 that supports linking search space sets for PDCCH repetitions in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may configure an association between a first PDCCH candidate corresponding to a first search space set and a second physical downlink control channel candidate corresponding to a second search space set. The operations of 1805 may be performed according to the methods described herein. In some examples, aspects of the operations of 1805 may be performed by a configuration manager as described with reference to FIGS. 12 through 15.

At 1810, the base station may transmit, to a UE, an indication of the association between the first PDCCH candidate and the second physical downlink control channel candidate. The operations of 1810 may be performed according to the methods described herein. In some examples, aspects of the operations of 1810 may be performed by an indication manager as described with reference to FIGS. 12 through 15.

The following provides an overview of aspects of the present disclosure:

Aspect 1: A method for wireless communication at a UE, comprising: receiving, from a base station, a configuration that indicates an association between a first search space set and a second search space set; determining an association between a first physical downlink control channel candidate in the first search space set and a second physical downlink control channel candidate in the second search space set; combining, according to the configuration and based at least in part on the determining, the first physical downlink control channel candidate and the second physical downlink control channel candidate based at least in part on monitoring for the first search space set and the second search space set; and decoding the combined first physical downlink control channel candidate and the second physical downlink control channel candidate.

Aspect 2: The method of aspect 1, further comprising: identifying, from the received configuration or a second configuration, a set of parameters that indicate the association between the first physical downlink control channel candidate and the second physical downlink control channel candidate, wherein the set of parameters comprises an indication of the first search space set associated with a first control resource set, an indication of the second search space set associated with a second control resource set, an index of the first physical downlink control channel candidate, an index of the second physical downlink control channel candidate, an aggregation level of the first physical downlink control channel candidate, or an aggregation level of the second physical downlink control channel candidate, or any combination thereof; and monitoring for the first search space set and the second search space set based at least in part on identifying the set of parameters.

Aspect 3: The method of aspect 2, wherein identifying the set of parameters comprises: identifying respective sets of parameters for each combined physical downlink control channel candidate of one or more combined physical downlink control channel candidates.

Aspect 4: The method of any of aspects 2 through 3, wherein identifying the set of parameters comprises: identifying respective sets of parameters for each search space set pair of one or more search space set pairs.

Aspect 5: The method of any of aspects 1 through 4, wherein the first physical downlink control channel candidate has a same aggregation level as the second physical downlink control channel candidate.

Aspect 6: The method of any of aspects 1 through 5, further comprising: identifying a first configuration for the first search space set, the first configuration indicating one or more monitoring occasions for the first search space set; identifying a second configuration for the second search space set, the second configuration indicating one or more monitoring occasions for the second search space set; and monitoring for the combined first physical downlink control channel candidate and the second physical downlink control channel candidate based at least in part on the first search space set and the second search space set and in accordance with the first configuration and the second configuration.

Aspect 7: The method of aspect 6, wherein monitoring for the first search space set and the second search space set comprises: identifying that the first search space set and the second search space set are included within a same time interval; and monitoring for the combined first physical downlink control channel candidate and the second physical downlink control channel candidate based at least in part on identifying that the first search space set and the second search space set are included within the same time interval.

Aspect 8: The method of aspect 7, further comprising: identifying that each of the first search space set and the second search space set have a single monitoring occasion within the time interval based at least in part on the first configuration and the second configuration; and identifying the time interval comprising the first search space set and the second search space set, wherein combining the first physical downlink control channel candidate and the second physical downlink control channel candidate is based at least in part on the time interval.

Aspect 9: The method of any of aspects 7 through 8, further comprising: identifying that at least one of the first search space set or the second search space set have a plurality of monitoring occasions within the same time interval based at least in part on the first configuration and the second configuration; and identifying an association between a monitoring occasion of the first search space set and a monitoring occasion of the second search space set during the time interval, wherein monitoring for the combined first physical downlink control channel candidate and the second physical downlink control channel candidate is based at least in part on the association between the monitoring occasion of the first search space set and the monitoring occasion of the second search space set.

Aspect 10: The method of any of aspects 7 through 9, further comprising: identifying that at least one of the first search space set or the second search space set have a plurality of monitoring occasions within the same time interval based at least in part on the first configuration and the second configuration; and identifying respective associations between each monitoring occasion of the first search space set and each monitoring occasion of the second search space set within the same time interval, wherein monitoring for the combined first physical downlink control channel candidate and the second physical downlink control channel candidate is based at least in part on the respective associations.

Aspect 11: The method of any of aspects 7 through 10, further comprising: identifying a first number of monitoring occasions for the first search space set within the same time interval based at least in part on the first configuration; identifying a second number of monitoring occasions for the second search space set within the same time interval based at least in part on the second configuration; and identifying an association between one or more monitoring occasions of the first search space set and one or more monitoring occasions of the second search space set based at least in part on the second number of monitoring occasions for the second search space set being less than the first number of monitoring occasions for the first search space set, wherein monitoring for the combined first physical downlink control channel candidate and the second physical downlink control channel candidate is based at least in part on the association between the one or more monitoring occasions of the first search space set and the one or more monitoring occasions of the second search space set, wherein the association is based at least in part on the one or more monitoring occasions for the first search space set occurring before the one or more monitoring occasions for the second search space set, the one or more monitoring occasions for the first search space set occurring after the one or more monitoring occasions for the second search space set, or any combination thereof.

Aspect 12: The method of any of aspects 7 through 11, further comprising: identifying a linking configuration that indicates an association between one or more instances of the first search space set and one or more instances of the second search space set within the same time interval, wherein monitoring for the combined first physical downlink control channel candidate and the second physical downlink control channel candidate is based at least in part on the linking configuration.

Aspect 13: The method of any of aspects 6 through 12, wherein monitoring for the first search space set and the second search space set comprises: identifying that the first search space set and the second search space set are included in two or more respective time intervals; and monitoring for the combined first physical downlink control channel candidate and the second physical downlink control channel candidate during the two or more respective time intervals based at least in part on identifying that the first search space set and the second search space set are included in the two or more respective time intervals.

Aspect 14: The method of aspect 13, further comprising: identifying, based at least in part on the configuration, an association between a first monitoring occasion for the first search space set and a second monitoring occasion for the second search space set during the two or more respective time intervals, wherein monitoring for the combined first physical downlink control channel candidate and the second physical downlink control channel candidate is based at least in part on the association the first monitoring occasion for the first search space set and the second monitoring occasion for the second search space set.

Aspect 15: The method of aspect 14, further comprising: identifying one or more parameters for monitoring for the first search space set and the second search space set, the one or more parameters comprising a combined monitoring occasion periodicity, a combined monitoring occasion offset, or any combination thereof, wherein combining the first physical downlink control channel candidate and the second physical downlink control channel candidate is based at least in part on the one or more parameters.

Aspect 16: The method of any of aspects 14 through 15, further comprising: identifying an instance of the first monitoring occasion for the first search space set within a time interval of the two or more respective time intervals; identifying an offset from the instance of the first monitoring occasion; and identifying the second monitoring occasion for the second search space set based at least in part on the offset.

Aspect 17: The method of any of aspects 1 through 16, wherein a first control resource set associated with the first search space set and a second control resource set associated with the second search space set are configured in a same serving cell.

Aspect 18: The method of any of aspects 1 through 17, wherein a first control resource set associated with the first search space set is different than a second control resource set associated with the second search space set.

Aspect 19: The method of aspect 18, wherein a configured presence or absence of a first transmission configuration indicator field associated with downlink control information for the first control resource set is the same as a configured presence or absence of a second transmission configuration indicator field associated with downlink control information for the second control resource set.

Aspect 20: The method of any of aspects 18 through 19, wherein a configured presence or absence of a first transmission configuration indicator field associated with downlink control information for the first control resource set is different from a configured presence or absence of a second transmission configuration indicator field associated with downlink control information for the second control resource set, the method further comprising: determining that a transmission configuration indicator field associated with downlink control information for the combined first physical downlink control channel candidate and the second physical downlink control channel candidate is present, the determination being based at least in part on the configured presence or absence of the first transmission configuration indicator field being different from the second transmission configuration indicator field.

Aspect 21: The method of any of aspects 18 through 20, wherein a transmission configuration indicator state for the first control resource set is different for the second control resource set.

Aspect 22: The method of any of aspects 1 through 21, wherein a first control resource set associated with the first search space set has a different pool index configuration as a second control resource set associated with the second search space set.

Aspect 23: The method of any of aspects 1 through 22, wherein a first control resource set associated with the first search space set has a same pool index configuration as a second control resource set associated with the second search space set.

Aspect 24: The method of any of aspects 1 through 23, wherein the first search space set and the second search space set have a same search space type.

Aspect 25: The method of any of aspects 1 through 24, wherein the first search space set and the second search space set are configured for monitoring a same format of downlink control information.

Aspect 26: The method of any of aspects 1 through 25, wherein the first physical downlink control channel candidate has a first aggregation level that is different than a second aggregation level for the second physical downlink control channel candidate, the first aggregation level and the second aggregation level are from a same set of aggregation levels.

Aspect 27: The method of any of aspects 1 through 26, wherein combining the first physical downlink control channel candidate and the second physical downlink control channel candidate is based at least in part on a capability of the UE, wherein a threshold number of combined physical downlink control channel candidates within a time interval are based at least in part on the capability of the UE.

Aspect 28: An apparatus for wireless communication at a UE, comprising a processor; memory coupled with the processor; and instructions stored in the memory and executable by the processor to cause the apparatus to perform a method of any of aspects 1 through 27.

Aspect 29: An apparatus for wireless communication at a UE, comprising at least one means for performing a method of any of aspects 1 through 27.

Aspect 30: A non-transitory computer-readable medium storing code for wireless communication at a UE, the code comprising instructions executable by a processor to perform a method of any of aspects 1 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving, from a base station, a configuration that indicates an association between a first search space set and a second search space set, wherein a first control resource set associated with the first search space set has a same pool index configuration as a second control resource set associated with the second search space set;
   determining an association between a first physical downlink control channel candidate in the first search space set and a second physical downlink control channel candidate in the second search space set;
   combining, according to the configuration and based at least in part on the determining, the first physical downlink control channel candidate and the second physical downlink control channel candidate based at least in part on monitoring for the first search space set and the second search space set; and
   decoding the combined first physical downlink control channel candidate and the second physical downlink control channel candidate.

2. The method of claim 1, wherein the first search space set and the second search space set have a same search space type.

3. The method of claim 1, wherein the first search space set and the second search space set are configured for monitoring a same format of downlink control information.

4. A UE for wireless communication, comprising:
   memory; and
   one or more processors coupled with the memory, the one or more processors configured to cause the UE to:
      receive, from a base station, a configuration that indicates an association between a first physical downlink control channel candidate corresponding to a first search space set and a second physical downlink control channel candidate corresponding to a second search space set, wherein a first control resource set associated with the first search space set has a same pool index configuration as a second control resource set associated with the second search space set;
      combine, according to the configuration, the first physical downlink control channel candidate and the second physical downlink control channel candidate based at least in part on monitoring for the first search space set and the second search space set; and
      decode the combined first physical downlink control channel candidate and the second physical downlink control channel candidate.

5. A non-transitory computer-readable medium storing code for wireless communication at a user equipment (UE), the code comprising instructions executable by a processor to:
   receive, from a base station, a configuration that indicates an association between a first physical downlink control channel candidate corresponding to a first search space set and a second physical downlink control channel candidate corresponding to a second search space set, wherein a first control resource set associated with the first search space set has a same pool index configuration as a second control resource set associated with the second search space set;
   combine, according to the configuration, the first physical downlink control channel candidate and the second physical downlink control channel candidate based at least in part on monitoring for the first search space set and the second search space set; and
   decode the combined first physical downlink control channel candidate and the second physical downlink control channel candidate.

6. The method of claim 1, wherein the first search space set and the second search space set are UE specific search space sets and are configured for transmitting control information to the UE.

7. The method of claim 1, wherein the first search space set and the second search space set are common search space sets and are configured for transmitting control information to a plurality of UEs including the UE.

8. The method of claim 1, wherein a number of monitoring occasions within a slot of each of the first search space set and the second search space set is aligned with a second number of monitoring occasions within a slot of the combined first physical downlink control channel candidate and the second physical downlink control channel candidate.

9. The method of claim 1, wherein a periodicity and an offset of each of the first search space set and the second search space set is aligned with a second periodicity and a second offset of the combined first physical downlink control channel candidate and the second physical downlink control channel candidate.

10. The UE of claim 4, wherein the first search space set and the second search space set have a same search space type.

11. The UE of claim 4, wherein the first search space set and the second search space set are configured for monitoring a same format of downlink control information.

12. The UE of claim 4, wherein the first search space set and the second search space set are UE specific search space sets and are configured for transmitting control information to the UE.

13. The UE of claim 4, wherein the first search space set and the second search space set are common search space sets and are configured for transmitting control information to a plurality of UEs including the UE.

14. The UE of claim 4, wherein a number of monitoring occasions within a slot of each of the first search space set and the second search space set is aligned with a second number of monitoring occasions within a slot of the combined first physical downlink control channel candidate and the second physical downlink control channel candidate.

15. The UE of claim 4, wherein a periodicity and an offset of each of the first search space set and the second search space set is aligned with a second periodicity and a second offset of the combined first physical downlink control channel candidate and the second physical downlink control channel candidate.

16. The non-transitory computer-readable medium of claim 5, wherein the first search space set and the second search space set have a same search space type.

17. The non-transitory computer-readable medium of claim 5, wherein the first search space set and the second search space set are configured for monitoring a same format of downlink control information.

18. The non-transitory computer-readable medium of claim 5, wherein the first search space set and the second search space set are UE specific search space sets and are configured for transmitting control information to the UE.

19. The non-transitory computer-readable medium of claim 5, wherein the first search space set and the second search space set are common search space sets and are configured for transmitting control information to a plurality of UEs including the UE.

20. The non-transitory computer-readable medium of claim 5, wherein a number of monitoring occasions within a slot of each of the first search space set and the second search space set is aligned with a second number of monitoring occasions within a slot of the combined first physical downlink control channel candidate and the second physical downlink control channel candidate.

* * * * *